US011700100B2

(12) United States Patent
Taghizadeh Motlagh et al.

(10) Patent No.: US 11,700,100 B2
(45) Date of Patent: Jul. 11, 2023

(54) CONFIGURING A SENSING REFERENCE SIGNAL

(71) Applicant: Lenovo (Singapore) Pte. Ltd., New Tech Park (SG)

(72) Inventors: Seyedomid Taghizadeh Motlagh, Oberursel (DE); Ali Ramadan Ali, Munich (DE); Ankit Bhamri, Rödermark (DE); Sher Ali Cheema, Ilmenau (DE); Razvan-Andrei Stoica, Essen (DE); Hyejung Jung, Northbrook, IL (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/538,978

(22) Filed: Nov. 30, 2021

(65) Prior Publication Data
US 2023/0171060 A1 Jun. 1, 2023

(51) Int. Cl.
*H04L 5/00* (2006.01)

(52) U.S. Cl.
CPC .......... *H04L 5/0051* (2013.01); *H04L 5/0016* (2013.01); *H04L 5/0053* (2013.01)

(58) Field of Classification Search
CPC .... H04L 5/0051; H04L 5/0053; H04L 5/0016
See application file for complete search history.

(56) References Cited

FOREIGN PATENT DOCUMENTS

| EP | 3240207 A1 | 11/2017 |
|---|---|---|
| WO | 2019235906 A1 | 12/2019 |

OTHER PUBLICATIONS

M. Kiviranta et al., "5G Radar: Scenarios, Numerology and Simulations", 2019 International Conference on Military Communications and Information Systems (ICMCIS), May 1, 2019, Abstract p. 1.
P. Kumari et al., "IEEE 802.11 ad-Based Radar: An Approach to Joint Vehicular Communication-Radar System", IEEE Transactions on Vehicular Technology, Nov. 17, 2017, pp. 1-35.
J. Fink et al., "Comparison of OFDM Radar and Chirp Sequence Radar", IEEE, 2015 16th International Radar Symposium (IRS), Aug. 27, 2015, pp. 1-6.

(Continued)

*Primary Examiner* — Ronald B Abelson
(74) *Attorney, Agent, or Firm* — Kunzler Bean & Adamson

(57) ABSTRACT

Apparatuses, methods, and systems are disclosed for configuring a sensing reference signal. One method includes receiving, at a first device, configuration information from a second device. The configuration includes: a set of sensing reference signal sequence generation parameters; a set of sensing reference signal resource pattern parameters, wherein a pattern corresponding to the set of sensing reference signal resource pattern parameters includes time domain locations of symbols within a sensing reference signal, frequency domain locations of resource elements within the sensing reference signal, or a combination thereof; and information indicating to map a generated sequence based on the pattern on at least one antenna to create a sensing reference signal pattern. The method includes generating a sensing reference signal. The method includes transmitting and/or receiving the sensing reference signal according to the configuration information.

20 Claims, 13 Drawing Sheets

(56) References Cited

OTHER PUBLICATIONS

Jan Mietzner, "DFT-Spread OFDM MIMO-Radar—An Alternative for Reduced Crest Factors", IEEE, 2019 20th International Radar Symposium (IRS), Jul. 22, 2019, Abstract pp. 1-2.

C. G. Barneto et al., "Full-Duplex OFDM Radar With LTE and 5G NR Waveforms: Challenges, Solutions, and Measurements", IEEE, IEEE Transactions on Microwave Theory and Techniques, Aug. 19, 2019, pp. 1-13.

PCT/IB2022/061613, "Notification of Transmittal of the International Search Report and the Written Opinion of the International Searching Authority, or the Declaration", International Searching Authority, dated Feb. 23, 2023, pp. 1-19.

Hofstadler et al., "Joint Communication and Sensing: 5G NR Compliant Ranging Using the Sounding Reference Signal", IEEE, Journal of Latex Class Files, vol. 14, No. 8, Aug. 2021, pp. 1-5.

Kanhere et al., "Target Localization using Bistatic and Multistatic Radar with 5G NR Waveform", IEEE 93rd Vehicular Technology Conference (VTC-Spring), Apr. 2021, pp. 1-7.

Liu et al., "Integrated Sensing and Communications: Towards Dual-functional Wireless Networks for 6G and Beyond", IEEE, arXiv:2108.07165v1 [eess.SP], Aug. 16, 2021, pp. 1-36.

ZTE, "Discussion on grant-free transmission for URLLC", 3GPP TSG RAN WG1 Meeting #87 R1-1611296, Nov. 14-18, 2016, pp. 1-7.

900

902

1000

1002

CONFIGURING A SENSING REFERENCE SIGNAL

FIELD

The subject matter disclosed herein relates generally to wireless communications and more particularly relates to configuring a sensing reference signal.

BACKGROUND

In certain wireless communications networks, sensing reference signals may be used. In such networks, sensing reference signals may have any number of configurations.

BRIEF SUMMARY

Methods for configuring a sensing reference signal are disclosed. Apparatuses and systems also perform the functions of the methods. One embodiment of a method includes receiving, at a first device, configuration information from a second device. The configuration includes: a set of sensing reference signal sequence generation parameters; a set of sensing reference signal resource pattern parameters, wherein a pattern corresponding to the set of sensing reference signal resource pattern parameters includes time domain locations of symbols within a sensing reference signal, frequency domain locations of resource elements within the sensing reference signal, or a combination thereof; and information indicating to map a generated sequence based on the pattern on at least one antenna to create a sensing reference signal pattern. In some embodiments, the method includes generating a sensing reference signal. In certain embodiments, the method includes transmitting the sensing reference signal according to the configuration information, receiving the sensing reference signal according to the configuration information, or a combination thereof.

One apparatus for configuring a sensing reference signal includes a first device. In some embodiments, the apparatus includes a receiver that receives configuration information from a second device. The configuration includes: a set of sensing reference signal sequence generation parameters; a set of sensing reference signal resource pattern parameters, wherein a pattern corresponding to the set of sensing reference signal resource pattern parameters includes time domain locations of symbols within a sensing reference signal, frequency domain locations of resource elements within the sensing reference signal, or a combination thereof; and information indicating to map a generated sequence based on the pattern on at least one antenna to create a sensing reference signal pattern. In various embodiments, the apparatus includes a processor that generates a sensing reference signal. In certain embodiments, the apparatus includes a transmitter. The transmitter transmits the sensing reference signal according to the configuration information, the receiver receives the sensing reference signal according to the configuration information, or a combination thereof.

Another embodiment of a method for configuring a sensing reference signal includes transmitting, from a second device, configuration information to a first device. The configuration includes: a set of sensing reference signal sequence generation parameters; a set of sensing reference signal resource pattern parameters, wherein a pattern corresponding to the set of sensing reference signal resource pattern parameters includes time domain locations of symbols within a sensing reference signal, frequency domain locations of resource elements within the sensing reference signal, or a combination thereof; and information indicating to map a generated sequence based on the pattern on at least one antenna to create a sensing reference signal pattern. In certain embodiments, the method includes receiving the sensing reference signal according to the configuration information, transmitting the sensing reference signal according to the configuration information, or a combination thereof.

Another apparatus for configuring a sensing reference signal includes a second device. In some embodiments, the apparatus includes a transmitter that transmits configuration information to a first device. The configuration includes: a set of sensing reference signal sequence generation parameters; a set of sensing reference signal resource pattern parameters, wherein a pattern corresponding to the set of sensing reference signal resource pattern parameters includes time domain locations of symbols within a sensing reference signal, frequency domain locations of resource elements within the sensing reference signal, or a combination thereof; and information indicating to map a generated sequence based on the pattern on at least one antenna to create a sensing reference signal pattern. In various embodiments, the apparatus includes a receiver. The receiver receives the sensing reference signal according to the configuration information, the transmitter transmits the sensing reference signal according to the configuration information, or a combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
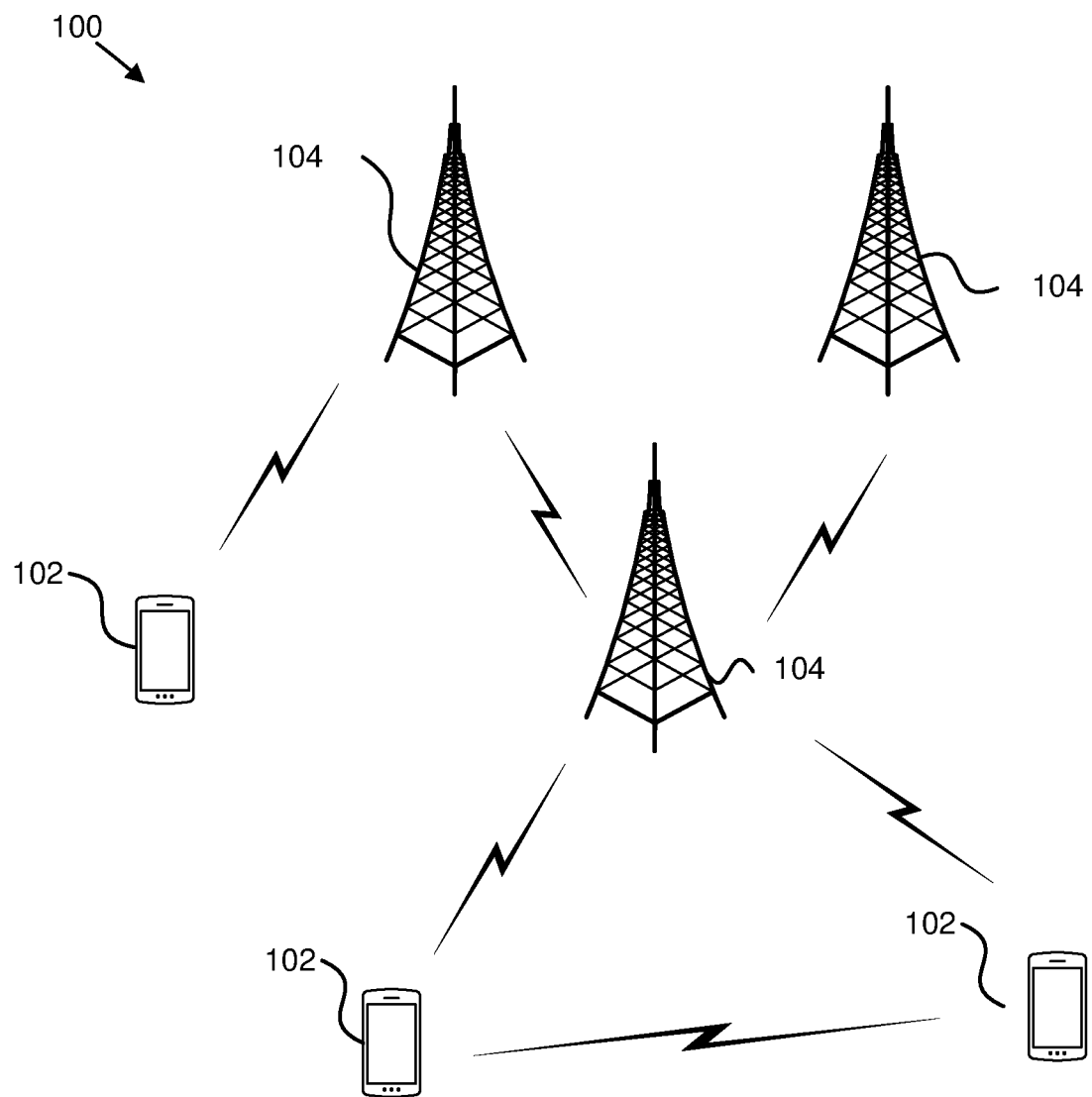
FIG. 1 is a schematic block diagram illustrating one embodiment of a wireless communication system for configuring a sensing reference signal.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring a sensing reference signal. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may receive, at a first device, configuration information from a second device. The configuration includes: a set of sensing reference signal sequence generation parameters; a set of sensing reference signal resource pattern parameters, wherein a pattern corresponding to the set of sensing reference signal resource pattern parameters includes time domain locations of symbols within a sensing reference signal, frequency domain locations of resource elements within the sensing reference signal, or a combination thereof; and information indicating to map a generated sequence based on the pattern on at least one antenna to create a sensing reference signal pattern. In some embodiments, the network unit 104 may generate a sensing reference signal. In certain embodiments, the network unit 104 may transmit the sensing reference signal according to the configuration information, receive the sensing reference signal according to the configuration information, or a combination thereof. Accordingly, the network unit 104 may be used for configuring a sensing reference signal.

In certain embodiments, a network unit 104 may transmit, from a second device, configuration information to a first device. The configuration includes: a set of sensing reference signal sequence generation parameters; a set of sensing reference signal resource pattern parameters, wherein a pattern corresponding to the set of sensing reference signal resource pattern parameters includes time domain locations of symbols within a sensing reference signal, frequency domain locations of resource elements within the sensing reference signal, or a combination thereof; and information indicating to map a generated sequence based on the pattern on at least one antenna to create a sensing reference signal pattern. In certain embodiments, the network unit 104 may receive the sensing reference signal according to the configuration information, transmitting the sensing reference signal according to the configuration information, or a combination thereof. Accordingly, the network unit 104 may be used for configuring a sensing reference signal.

Figure 2:
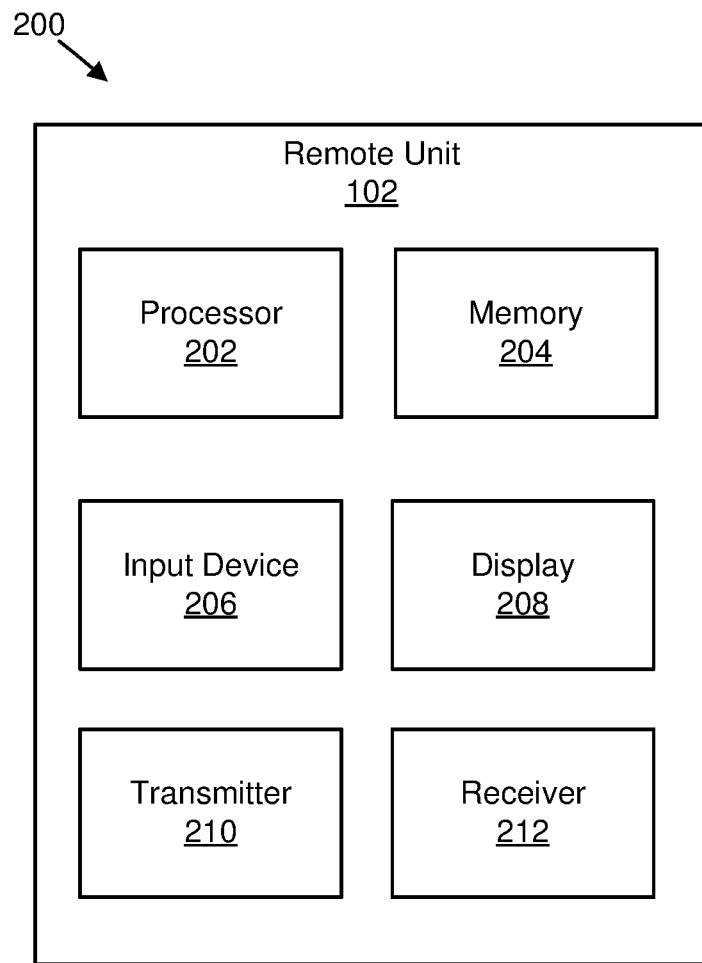
FIG. 2 is a schematic block diagram illustrating one embodiment of an apparatus that may be used for configuring a sensing reference signal.

FIG. 2 depicts one embodiment of an apparatus 200 that may be used for configuring a sensing reference signal. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
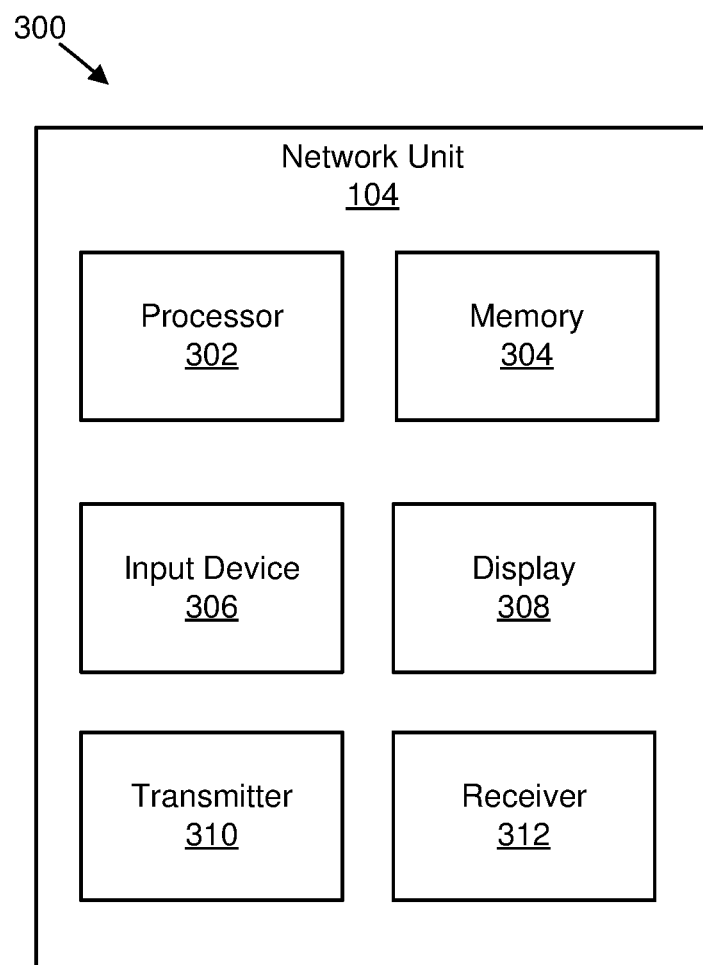
FIG. 3 is a schematic block diagram illustrating one embodiment of an apparatus that may be used for configuring a sensing reference signal.

FIG. 3 depicts one embodiment of an apparatus 300 that may be used for configuring a sensing reference signal. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 receives configuration information from a second device. The configuration includes: a set of sensing reference signal sequence generation parameters; a set of sensing reference signal resource pattern parameters, wherein a pattern corresponding to the set of sensing reference signal resource pattern parameters includes time domain locations of symbols within a sensing reference signal, frequency domain locations of resource elements within the sensing reference signal, or a combination thereof; and information indicating to map a generated sequence based on the pattern on at least one antenna to create a sensing reference signal pattern. In various embodiments, the processor 302 generates a sensing reference signal. In certain embodiments, the apparatus includes a transmitter. The transmitter 310 transmits the sensing reference signal according to the configuration information, the receiver 312 receives the sensing reference signal according to the configuration information, or a combination thereof.

In some embodiments, the transmitter 310 transmits configuration information to a first device. The configuration includes: a set of sensing reference signal sequence generation parameters; a set of sensing reference signal resource pattern parameters, wherein a pattern corresponding to the set of sensing reference signal resource pattern parameters includes time domain locations of symbols within a sensing reference signal, frequency domain locations of resource elements within the sensing reference signal, or a combination thereof; and information indicating to map a generated sequence based on the pattern on at least one antenna to create a sensing reference signal pattern. In various embodiments, the receiver 312 receives the sensing reference signal according to the configuration information, the transmitter 310 transmits the sensing reference signal according to the configuration information, or a combination thereof.

In certain embodiments, radio sensing may be used in cellular wireless networks (e.g., as a mechanism to improve the network performance and/or as an enabler to serve vertical use configurations). In some embodiments, radio sensing obtains environment information by: 1) transmission of a sensing excitation signal (e.g., sensing reference signal ("RS")) from a network entity (e.g., sensing transmit ("TX") node); 2) reception of reflections and/or echoes of the transmitted sensing excitation signal from the environment by a network entity (e.g., sensing receive ("RX") node); and/or 3) processing of the received reflections and inferring relevant information from the environment.

In various embodiments, to enable radio sensing capability within a communication network, a sensing RS may be defined and configured for sensing TX and sensing RX nodes in accordance with the requirements of a specific sensing task, the available network and/or user equipment ("UE") capabilities for sensing measurement and/or processing and the available resources that may be used for sensing, while allowing for a communicating network function to continue without degradation.

As found herein, there may be solutions for a flexible definition and/or configuration of sensing RS for transmission, for reception, or jointly for transmission and reception by performing: 1) sequence generation and sequence manipulation and/or adjustments for a sensing RS; 2) a flexible definition of a sensing RS resource pattern along a time and/or frequency domain; 3) a mapping of the sensing RS sequence within physical time and/or frequency resources; 4) beam and/or spatial filter definition for sensing RS transmission, for sensing RS reception, and/or for joint sensing RS transmission and reception; and/or 5) flexible cyclic prefix ("CP") overhead adjustment for sensing RS.

In certain embodiments, there may be available reference signals within new radio ("NR") including demodulation reference signal ("DMRS"), phase tracking reference signal ("PTRS"), channel state information ("CSI") RS ("CSI-RS"), positioning reference signal ("PRS"), and/or sounding reference signal ("SRS") that may be used as sensing excitation for some of basic use configurations. In some embodiments, some available RS are combined and/or augmented with additional parameters to define a satisfying sensing RS. Since the available RS are not designed for the purpose of environment sensing, but mainly to extract communication-needed channel parameters, the application of the reference signals for some configurations may either lead to a reduced signaling and/or resource efficiency (e.g., if an RS needs to be augmented with several other parameters and/or configurations to achieve a specific requirement, or if the spent resources are unnecessarily high due to the limited available patterns), or the infeasibility of the sensing task (e.g., if the sensing signal does not support the needed waveform parameters—such as cyclic prefix ("CP") overhead).

In various embodiments, limitations of use of available reference signals may include: 1) limited time and/or frequency domain pattern flexibility (e.g., the time and/or frequency pattern is a decisive factor to satisfy the fundamental radar requirements (in terms of supported distance dynamic range and resolution, speed dynamic range and resolution, and/or radar processing gain) in an efficient manner. In most cases, the time-domain periodicity is usually fixed, or lacks the flexibility to define sensing RS efficiently, whereas the frequency domain patterns are usually limited. A relatively higher flexibility may be reached with CSI-RS (by enabling both time-periodicity as well as a proper frequency domain density over a large bandwidth). Nevertheless, this supports only single periodicity.); 2) limited flexibility on numerology and/or waveform parameters (e.g., symbol dedicated to sensing may follow a different CP duration and/or waveform parameters. This is particularly needed if targeting a high-speed and/or high distance sensing scenario that requires especially large CP overhead and/or subcarrier spacing ("SCS"), or potentially another waveform); 3) limited multiplexing flexibility (e.g., some of the proposed multiplexing methods for sensing RS are beneficial for facilitating large sensing excitations (e.g., if sensing continues over multiple milliseconds, it is beneficial to use superimposed sensing RS at least during part of the sensing RS transmission). Current reference signals may not support this or support limited multiplexing options (e.g., including SRS, CSI-RS)); 3) limited radar-specific sequence adjustment and/or separation (e.g., the possibility of the sequence adjustments may not be supported in current reference signals); and/or 4) by defining a specific sensing RS, many of the other signaling requirements may be done implicitly (e.g., a specific sensing RS pattern also defines specific measurement criteria, requirements, and/or a type of multiplexing).

In certain embodiments, there may be a flexible definition of a sensing RS resource pattern along a time and/or frequency domain by: 1) parametric and/or codebook based definition of sensing RS resource pattern along the time domain, along the frequency domain, or jointly along the time and frequency domain (e.g., frequency hopping) (e.g., via a relative definition of a sensing RS pattern according to a known and/or pre-defined pattern, via a multi-pattern and/or multi-resolution sensing RS resource pattern that may be constructed, and/or via a partially unknown sensing RS pattern definition); 2) a sequence definition and manipulation and/or adjustments for sensing RSs (e.g., a parameterized sequence definition where a Zadoff-Chu or a gold binary sequence are used as a base sequence generator, sequence manipulations via harmonic multiplication along time and/or frequency domain or code block based orthogonalization of the sensing RS, sequence scrambling to protect the sequence from unauthorized usage (e.g., sensing measurements by untrusted sensing RX nodes)); 3) mapping and/or accommodation of the sensing RS sequence within physical time and/or frequency resources (e.g., mapping types with a time domain prioritization, a frequency domain prioritization, and a constraint time or frequency domain prioritization, a power boosting and/or attenuation mechanism on the sensing REs); 4) beam and/or spatial filter definition for sensing RS transmission, for sensing RS reception, and for joint sensing RS transmission and reception (e.g., a beam configuration for sensing RS based on a quasi-co-location ("QCL") type-D indication with a RS, via an indication of beam-defining parameters via angular information or via a codebook); and/or 5) flexible CP-overhead adjustment for sensing RS (e.g., flexible CP overhead configuration to enable variable CP overhead among different sensing RS or different CP overhead among different symbols within the same sensing RS)

It should be noted that embodiments described herein are not limited to the embodiments individually, and one or more elements from one or more embodiments may be combined. Moreover, the terms sensing RS and sensing RS-defining parameters may be used interchangeably.

In a first embodiment, there may be a parameterized sensing RS resource pattern definition. In the first embodiment, a sensing RS resource pattern along a time and frequency axis are defined via a set of pattern defining parameters along the time axis such as time domain to symbols, pattern defining parameters along the frequency axis such as resource elements, or jointly along the time and frequency domain.

In certain embodiments, there may be a basic parameterized definition of a time and/or frequency resource pattern.

In some embodiments, a parameter set $\{T_{init}, F_{init}, L_T, \Delta_T, L_F, \Delta_F\}$ is used to indicate a sensing signal resource pattern along the time and frequency axis. In such a parameter set, $L_T$ indicates the time domain duration in terms of the number of symbols over which the intended sensing RS signal is present, $\Delta_T$ indicates the inter-symbol spacing in time within the sensing RS in terms of the number of symbols, $L_F$ indicates the frequency domain length in terms of the number of resource elements over which the sensing RS is present, and $\Delta_F$ represents the inter-RE frequency domain spacing. The time displacement of the symbol located at the beginning of the sensing signal block with respect to the beginning of the radio frame in terms of the number of symbols is represented by $T_{init}$. The frequency displacement of the resource element ("RE") located at the beginning of the sensing signal block with respect to a reference subcarrier (e.g., the dual connectivity ("DC") subcarrier) is denoted by $F_{init}$. Examples of parametric definitions of sensing RS patterns are depicted in FIGS. 4 and 5.

In various embodiments, an extended parameter set $\{T_{init}, F_{init}, L_T, \Delta_T, L_F, \Delta_F, T_{slot-init}, F_{RB-init}, \Delta_{slot}, \Delta_{RB}, L_{slot}, L_{RB}\}$ is used to indicate the sensing signal resource pattern along the time and frequency axis. In the extended parameter set, $L_T$ indicates the time domain duration in terms of the number of symbols over which the intended sensing RS signal is present in a slot, $\Delta_T$ indicates the inter-symbol spacing in time within the sensing RS in terms of the number of symbols, $L_{slot}$ represents number of slots allocated for sensing RS, $L_F$ indicates the frequency-domain length in terms of the number of resource elements over which the sensing RS is present in an RB, $\Delta_F$ represents the inter-RE frequency domain spacing, and $L_{RB}$ represents the number of RBs allocated for sensing RS. The time displacement of the symbol located at the beginning of the sensing signal block with respect to the beginning of the slot in terms of the number of symbols is represented by $T_{init}$, whereas the $T_{slot-init}$ indicates the time-displacement of the first sensing RS-containing slot with respect to the beginning of the radio frame. The frequency displacement of the symbol located at the beginning of the sensing signal block with respect to the beginning of the RB is denoted by $F_{init}$, whereas the $F_{RB-init}$ indicates the frequency displacement of the first sensing RS-containing RB with respect to a reference RB (e.g., the first RB). The parameter $\Delta_{slot}$ represents the slot displacement among two consecutive slots containing sensing RS resources. The parameter $\Delta_{RB}$ represents the RB displacement among two consecutive RBs containing sensing RS resources. In certain embodiments, the extended parameters $T_{slot-init}, F_{RB-init}, \Delta_{slot}, \Delta_{RB}, L_{slot}, L_{RB}$ are defined with other time and/or frequency block sizes other than a single RB and a single slot. In some embodiments, the extended parameters are defined for a frequency block size of two or more RBs, for a time block size of two or more slots, or a combination thereof.

Figure 4:
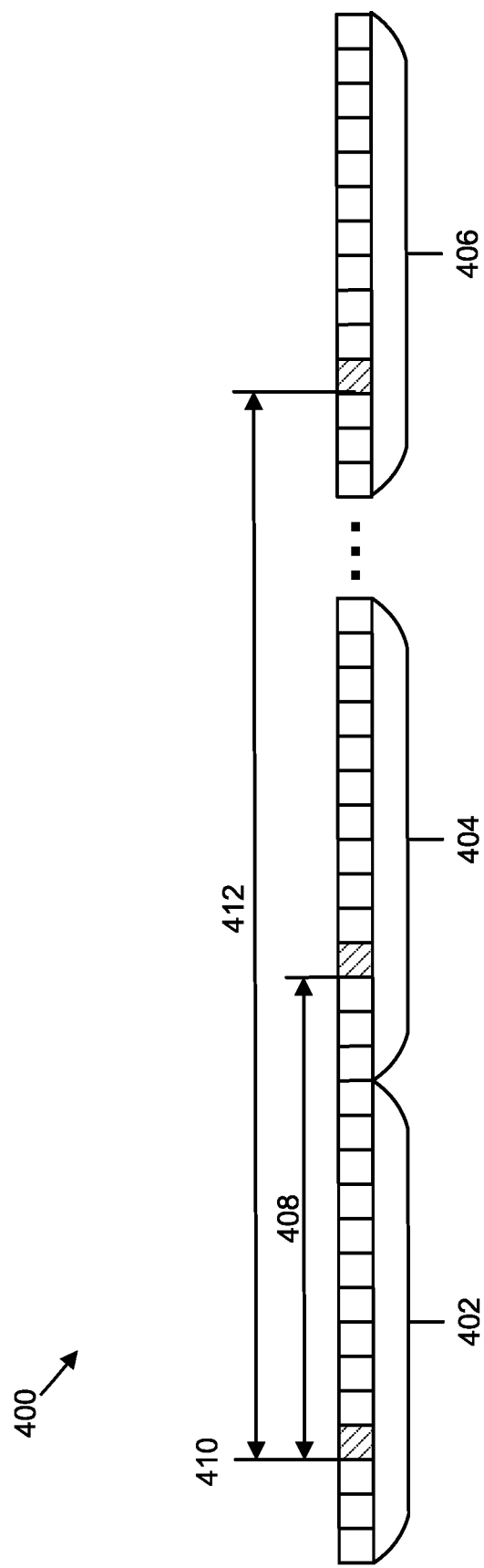
FIG. 4 is a schematic block diagram illustrating one embodiment of an allocation pattern.

FIG. 4 is a schematic block diagram illustrating one embodiment of an allocation pattern 400 along a time axis. The allocation pattern includes a first slot 402, a second slot 404, and a Nth slot 406. A time $\Delta_T$ 408 from an initial time $T_{init}$ 410 indicates a time between sensing signals, and a time $L_T$ 412 from the initial time $T_{init}$ 410 indicates a time from the start of a reference sensing signal to the start of another sensing signal.

Figure 5:
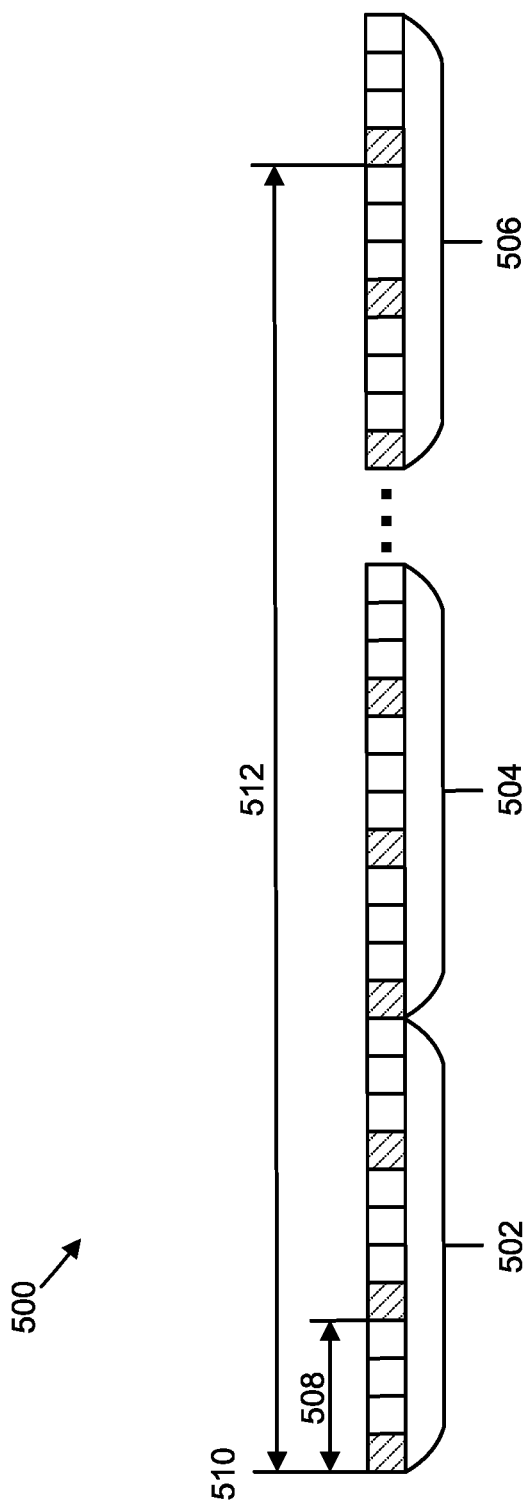
FIG. 5 is a schematic block diagram illustrating another embodiment of an allocation pattern.

FIG. 5 is a schematic block diagram illustrating another embodiment of an allocation pattern 500 along a frequency axis. The allocation pattern includes a first resource block ("RB") 502, a second RB 504, and a Mth RB 506. A frequency $\Delta F$ 508 from an initial frequency $F_{init}$ 510 indicates a frequency between sensing signals, and a frequency $L_F$ 512 from the initial frequency $F_{init}$ 510 indicates a frequency from the start of a reference sensing signal to the start of another sensing signal.

In certain embodiments, there may be an initial symbol and/or RE referencing. In some embodiments, $T_{init}$ indicates a relative position within a sensing signal block and not necessarily the first sensing symbol (e.g., $T_{init}$ refers to the symbol located at the center or end of the time-domain allocation, or to a symbol location that satisfies some a priori-known conditions). In various embodiments, $T_{init}$ is defined relative to another known symbol position in a slot (e.g., relative to the downlink control information ("DCI") containing the sensing signal configuration and/or activation information), or to the position of $T_{init}$ in a prior sensing signal allocation or to the position of the end of a prior sensing block. A sensing block may be defined as the number of slots allocated for sensing RS transmission. In some embodiments, when $T_{init}$ is not explicitly given, it holds the first possible position within a slot that satisfies some conditions (e.g., the symbol immediately following control resource set ("CORESET") and/or physical downlink data channel ("PDDCH") symbol occasions or DMRS type-A or a known semi-static and/or periodic allocations of other signals. In various embodiments, possible initial symbol positions are limited to a subset of feasible symbols that satisfy some additional conditions (e.g., symbols in an order and/or step size of a pre-defined value distance to a known symbol position). In certain embodiments, a value of $T_{init}$ is an index identifying an initial symbol occasion alone or together with additional constraints.

In some embodiments, $F_{init}$ refers to a relative position within a frequency domain allocation of sensing RS and not necessarily the first sensing RE (e.g., $F_{init}$ refers to an RE located at the center or end of the frequency-domain allocation of an RB, or to an RE location that satisfies some a priori-known conditions). In various embodiments, $F_{init}$ is defined relative to another known RE position (e.g., relative to a beginning or end of a prior sensing RS). In certain embodiments, if $F_{init}$ is not explicitly given, it holds a first possible position that satisfies some conditions (e.g., RE located outside of DMRS type-A occasions). In other words, a sensing RS may be mapped to any frequency resources in an active bandwidth part ("BWP") and not necessary within a UE allocation. In some embodiments, possible initial RE positions may be limited to a subset of feasible REs that satisfy some additional conditions (e.g., RE displacements in the order and/or step size of a value that achieves a certain resolution requirement). In various embodiments, a value of $F_{init}$ is an index identifying an initial RE location together with additional constraints. In certain embodiments, frequency domain allocation is symmetric with respect to a known frequency location (e.g., DC subcarrier); hence only the pattern associated with an upper (or lower) half is defined.

In various embodiments, there may be frequency domain pattern hopping. In certain embodiments, an initial RE is not constant for different time domain symbols and sensing RS mapping may follow a scattered pattern to cover required frequency and/or time coefficients with a smaller number of RS REs. In some embodiments, a frequency domain pattern experiences a circular shift with a defined time domain periodicity. In one embodiment, a frequency domain pattern undergoes a circular shift with a value of 1 RE for every symbol carrying the sensing RS. In other embodiments, an additional parameter is included in a sensing RS defining parameter set defining a frequency domain pattern modification as well as a periodicity of the frequency domain pattern modification over a time axis.

In certain embodiments, there may be a multi-resolution sensing RS pattern definition such as: a single parametric RS pattern definition or a codebook-based definition as defined to satisfy a specific sensing requirement. A sensing task may, at the same time, target multiple requirements or deal with multiple uncertainties. On the other hand, using a single pattern may lead to a reduced efficiency if multiple requirements are targeted at the same time (e.g., a higher speed range leads to a denser allocation in time-domain, which leads to an inefficient definition of the RS pattern when it is combined with a requirement on a high-speed resolution). In some embodiments, a large distance support together with high resolution for range estimation may lead to a dense frequency domain allocation over a large bandwidth.

In various embodiments, a parameterization may be extended to define a pattern with multiple time and/or frequency spans and spacings. In one example, this is done via the parameterization as $\{T_{init}, F_{init}, L_{T,1} \ldots L_{T,n}, \Delta_{T,1} \ldots \Delta_{T,n}, L_{F,1} \ldots L_{F,n} \ldots \Delta_{F,1} \ldots \Delta F_{F,n}\}$ or $\{T_{init}, F_{init}, L_{T,1}, \Delta_{T,1}, L_{F,1}, \Delta_{F,1}, T_{slot-init,1}, F_{RB-init,1}, \Delta_{slot,1}, \Delta_{RB,1}, L_{slot,1}, L_{RB,1}, \ldots, L_{T,n}, \Delta_{T,n}, L_{F,n}, \Delta_{F,n}, T_{slot-init,n}, F_{RB,init,n}, \Delta_{slot,n}, \Delta_{RB,n}, L_{slot,n}, L_{RB,n}\}$, where n indicates a number of cascaded sensing RS patterns representing different required resolutions. In certain embodiments, the multiple RS segments defined with the above parameterization are cascaded in a direction of the time axis where the frequency domain content of different segments starts from the same point $F_{init}$. In some embodiments, multiple RS segments defined with the above parameterization are superimposed in the time domain where the frequency-domain content of different segments starts from the same point $F_{init}$ or from a separate RE for each segment. In various embodiments, only a subset of parameters are included to define the multi-resolution RS pattern, e.g., $\{T_{init}, F_{init}, L_{T,1} \ldots L_{T,n}, \Delta_{T,1} \ldots \Delta_{T,n}, L_{F,1}, \Delta_F\}$, or $\{T_{init}, F_{init}, L_T, \Delta_{T,1} \ldots \Delta_{T,n}, L_F, \Delta_F\}$ or $\{T_{init}, F_{init}, L_T, \Delta_{T,1} \ldots \Delta_{T,n}, L_F, \Delta_F\}$, where the eliminated parameter is assumed to be constant over the multiple segments. In the above examples, the first instance is the case where the frequency domain pattern definition is unchanged over multiple RS segments, the second one indicates the case where the time domain pattern definition maintains the same length for different segments but with different spacings, and the latter instance indicates the case where the multiple segments share the same frequency-domain pattern as well as the length. In certain embodiments, the multi-resolution RS pattern in time domain or in frequency domain or jointly in the time and the frequency domain is defined via an index from a codebook, where the codebook includes the supported multi-resolution patterns. In some embodiments, the codebook including the multi-resolution RS patterns as well as the codebook including the single resolution RS patterns are the same codebook.

In various embodiments, multiple parameterized sensing RS patterns are combined, including a combination pattern, to define the sensing RS which supports multiple resolutions. In certain embodiments, the definition of the additional parameterized patterns in different segments is done relatively, where all or a subset of the parameters are defined in relation to the previous segment of the RS pattern. In some embodiments, there may be a special case of a multi-resolution pattern, where a pattern including a larger time domain spacing is cascaded (e.g., along the time axis) with a segment including a smaller time domain spacing.

In some embodiments, a multi-resolution RS pattern is constructed by following an incremental spacing pattern in time domain, in frequency domain, or jointly in both domains. In various embodiments, a pattern is parameterized similar to the parameterization used in $\{T_{init}, F_{init}, L_{T,1} \ldots L_{T,n}, \Delta_{T,1} \ldots \Delta_{T,n}, L_{F,1} \ldots L_{F,n}, \Delta_{F,1} \ldots \Delta_{F,n}\}$ where the unnecessary parameters are dropped. An example parameterization is $\{T_{init}, F_{init}, \Delta_{T,1} \ldots \Delta_{T,n}, L_F, \Delta F\}$ where the incremental spacing is limited to time domain and the frequency domain spacing is constant and the values of define the incremental distances in the time domain. In certain embodiments, a step size is included in the parameter set to define the subsequent time domain (or frequency domain) incremental spacing, e.g., $\{T_{init}, F_{init}, L_T, \Delta_T, S_T\}$. In some embodiments, the information of step size is used to eliminate other unnecessary (e.g., can be calculated dependent to the other parameters) subsequent distances or RS pattern overall length.

Figure 6:
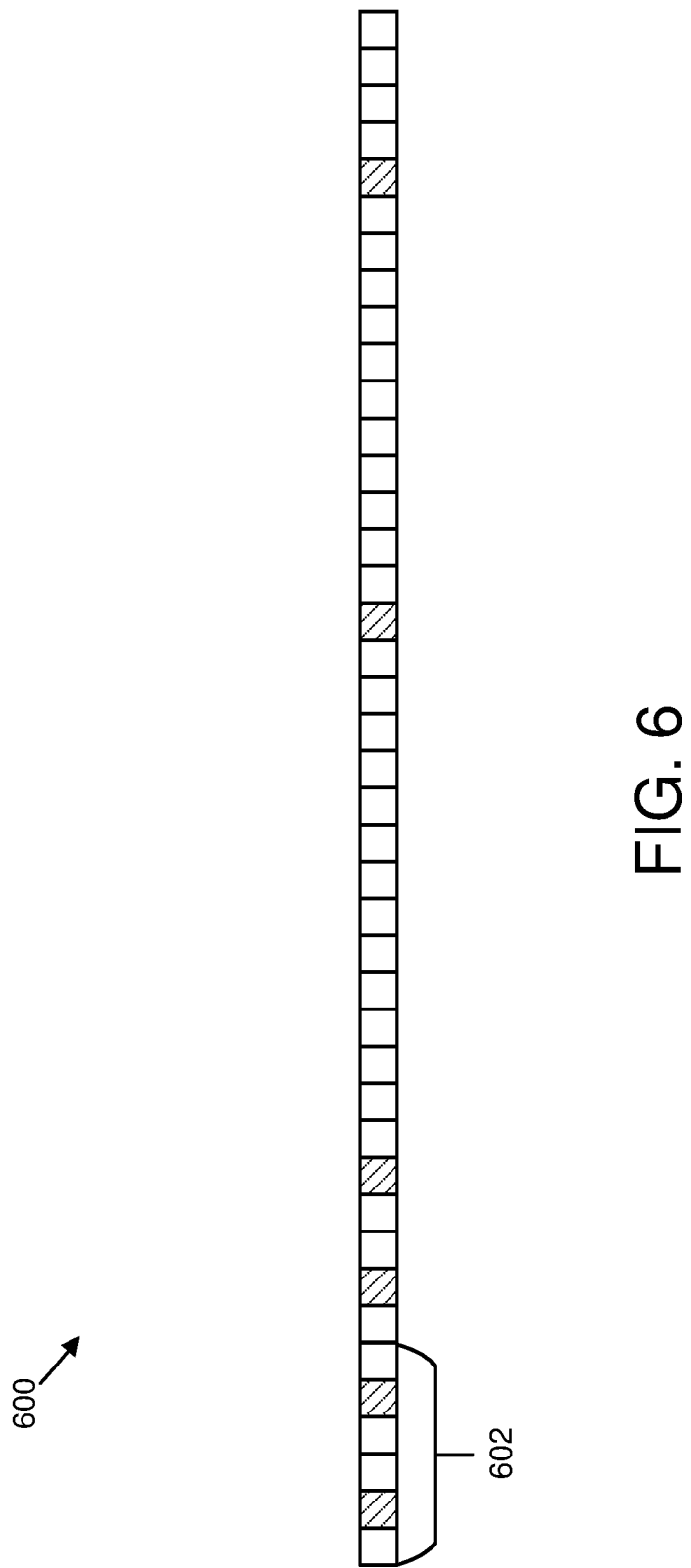
FIG. 6 is a schematic block diagram illustrating one embodiment of multi-resolution allocation.
Figure 7:
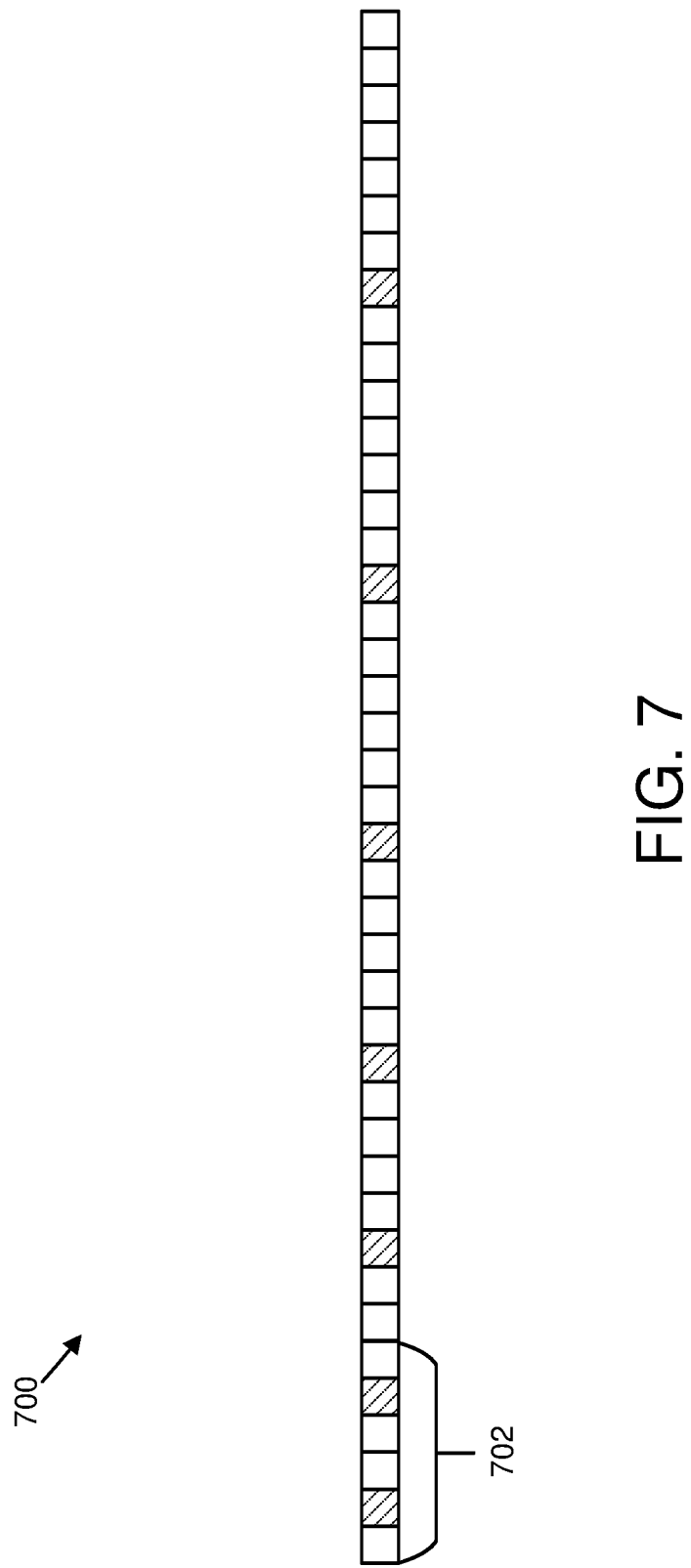
FIG. 7 is a schematic block diagram illustrating another embodiment of multi-resolution allocation.
Figure 8:
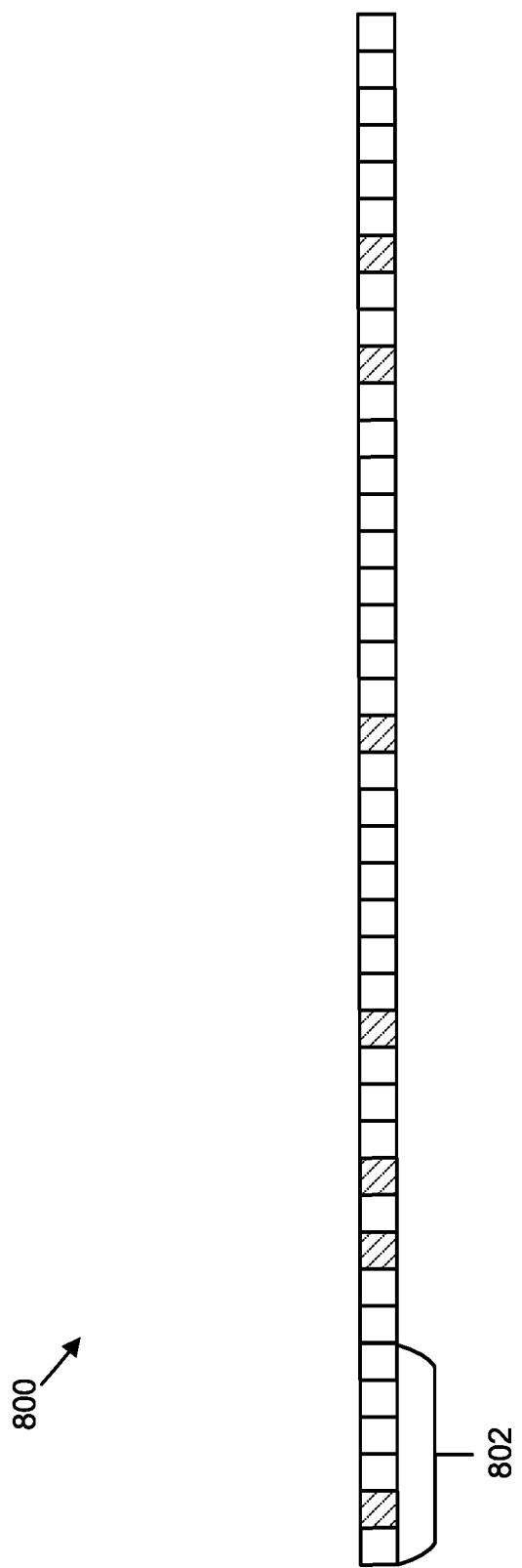
FIG. 8 is a schematic block diagram illustrating a further embodiment of multi-resolution allocation.

FIG. 6 is a schematic block diagram 600 illustrating one embodiment of multi-resolution allocation. The diagram 600 illustrates multiple time and frequency blocks 602. The shaded REs indicate allocated RSs in a multi-resolution pattern having multiple coexisting patterns. FIG. 7 is a schematic block diagram 700 illustrating another embodiment of multi-resolution allocation. The diagram 700 illustrates multiple time and frequency blocks 702. The shaded REs indicate allocated RSs in a multi-resolution pattern having incremental spacing. FIG. 8 is a schematic block diagram 800 illustrating a further embodiment of multi-resolution allocation. The diagram 800 illustrates multiple time and frequency blocks 802. The shaded REs indicate allocated RSs in a multi-resolution pattern having pseudo-random spacing.

In various embodiments, the multi-resolution RS pattern is constructed in time domain, in frequency domain, or both, where the spacing between the subsequent symbols follow a pseudo-random pattern and the pattern is shared with the receiver. In certain embodiments, the RS pattern with pseudo-random spacings are defined via an index from a codebook, where the codebook includes different RS patterns with pseudo-random spacings in time and/or frequency domains. In some embodiments, some of the different codebook elements represent different instances of RS patterns generated from the same spacing statistics (e.g., different realizations for an equal probability spacings of {2,4,7,11, 14,21} symbols in time domain). In various embodiments, some of the different codebook elements represent instances of RS patterns generated from different spacing statistics. In certain embodiments, the total duration of the RS in time and/or the total bandwidth are pattern-defining parameters. In some embodiments where the sensing RS pattern is defined via a codebook, an index representing the codebook is also indicated.

In a second embodiment, there may be a relative time and frequency pattern definition for sensing RS. In such an embodiment, it may be understood that a relative definition of sensing RS parameters to other (e.g., known and/or defined) RS parameters is not restricted to pattern defining parameters, but is intended to cover any parameter within the definition of a sensing RS (e.g., waveform related parameters) also when it is not explicitly mentioned.

According to the second embodiment, a sensing RS pattern is defined in relation to a previously defined pattern, where the pattern belongs to a previously defined sensing RS, a previously defined RS (e.g., CSI-RS, DMRS, PTRS, SRS, and so forth), or a previously defined pattern for scheduling within a data channel and/or control channel.

In certain embodiments, a relative definition includes a re-definition and/or modification of at least one of the pattern parameters. In some embodiments, a relative modification of a sensing RS pattern in time, frequency, or jointly in time and frequency may be done incrementally (e.g., incrementing a time duration by a given value compared to a previously defined pattern), whereas the other parameters remain unchanged. In various embodiments, an incremental indication involves an increment and/or decrement of at least one of the parameters if a parameterized definition of the RS pattern is used, or an increment and/or decrement in an indicated codebook field if a codebook based pattern definition is used. In certain embodiments, an incremental change is interpreted geometrically (e.g., when an increment equates to 2-fold increase and/or decrease of a specified parameter). In some embodiments, a definition and/or indication of an RS pattern is combined with a repetition factor (e.g., how many times an RS pattern is repeated to construct the new pattern). In various embodiments, a repetition indication is combined with a repetition pattern (e.g., an indication that a defined sensing RS is repeated over a time and/or frequency resource plane). In certain embodiments, a repetition pattern follows a parameterization defined via an embodiment found herein.

In some embodiments, a relative definition includes use of a subset of previously defined pattern parameters, where other parameters are augmented to the parameter subset to define a sensing RS. In various embodiments, a sensing RS is defined by borrowing a frequency domain resource pattern of a previously defined CSI-RS, and adding envisioned time domain pattern parameters, envisioned transmit and/or receive filters and/or beams, and/or a set of alternate waveform parameters (e.g., an alternate CP length and/or numerology) at the indicated time domain occasions. In certain embodiments, an SRS pattern is used with a repetition pattern following a parameterization as defined in an embodiment herein.

In various embodiments, a relative definition of a sensing RS with respect to another pattern (e.g., a CSI-RS pattern) is defined via an index from a codebook, where the codebook includes a potential pattern augmentation and/or repetition for all or a subset of pattern defining parameters. This may include specific build ups of all or subset of the sensing RS parameters found herein.

In certain embodiments, an uplink ("UL") or downlink ("DL") sensing RS pattern is defined with a similar parameterization as for a dl-PRS, including one or more NR-DL-PRS-ResourceSet over one or more separately defined NR-DL-PRS-Resource. In some embodiments, a sensing RS pattern is defined via the same parameterization as for a dl-PRS together with one or more dl-PRS-MutingOption1, one or more dl-PRS-MutingOption2, or a combination thereof.

In various embodiments, if multiple patterns are used for a relative sensing RS pattern definition, the RS pattern may be considered as a union of the defined patterns (e.g., the sensing RS elements will be the ones that exist in any or multiple of the previously defined patterns). In certain embodiments, if multiple RS patterns are indicated, the RS pattern may be constructed via the common elements (e.g., intersection) of the defined patterns (e.g., the sensing RS elements will be the ones that exist in patterns described herein). In some embodiments, a constructed RS pattern may be the difference and/or subtraction of an indicated pattern with another indicated pattern. In various embodiments, if multiple RS patterns are indicated, a combination type is also indicated to define the way by which a combined pattern is constructed. In certain embodiments, a combination type includes constructing a union of multiple patterns, a common part of multiple patterns, an exclusive or presence of multiple patterns, a cascaded pattern (e.g., in time and/or frequency) of previously defined sensing RS patterns, or some combination thereof. In certain embodiments, a defined RS pattern in one BWP is copied and/or reused to define a sensing RS pattern in another BWP. In some embodiments, a definition of an RS pattern may be done over a BWP which is not an active BWP for communication within a sensing RX.

In a third embodiment, there may be a partially unknown sensing RS pattern definition. In the third embodiment, pattern-defining parameters or a subset thereof is not defined and/or indicated to a sensing Rx node (e.g., the pseudo-random frequency domain pattern which is not defined for the sensing RX node). In this case, the sensing RX is required and/or indicated to perform a pattern search procedure prior to the usual sensing related processing and/or measurements. In various embodiments, if an exact pattern is not indicated to a sensing RX node, a set of possible parameter combination, one or more codebook types, and/or a set of entries from one or more parameter codebooks are indicated to the sensing RX to limit a search space.

In certain embodiments, if a UE is a sensing TX node, sensing RS pattern defining to parameters or a subset thereof are not defined and/or indicated to the sensing TX node. In some embodiments, a sensing TX is requested to choose remaining pattern parameters following a criterion (e.g., to reduce peak-to-average power ratio ("PAPR"), to increase energy efficiency, to self-configure given prospective transient and/or permanent device capabilities, etc.).

In various embodiments, support of a pattern recovery process or a parameter selection process among undetermined sensing RS parameters is communicated as a UE capability. In certain embodiments, a set of supported parameter combinations, supported codebook types, and/or a set of entries from one or more parameter codebooks (e.g., which are supported by a sensing RX for a pattern recovery process) are indicated as part of node capabilities.

In a fourth embodiment there may be a sequence definition for a sensing RS. According to this embodiment, a signal sequence to be mapped to time and/or frequency resources within a sensing RS are defined and indicated to sensing TX and sensing RX nodes via a set of parameters defining a sequence generation procedure. In some embodiments, a signal sequence r(n) is generated such that $r(n)=a_{tx}\tilde{r}_{L,u,v}(n)$, where $a_{tx}$ is a transmit power adjustment and/or amplification factor and a sensing sequence, $\tilde{r}_{L,u,v}(.)$ denotes a base sequence such that L is a length of the respective sequence, u is a type and/or class of the sequence, and v identifies an exact base sequence within the respective sequence type and/or class identified by u.

In various embodiments, an additional per-element weighting is augmented in the generation of r(n). This is expressed as $r(n)=a_{tx} w(n)\tilde{r}_{L,u,v}(n)$, where w(n) indicates a weighting pattern that is applied to a signal sequence. In some implementations, $w(n)=0, n \in \mathcal{N}$, and w(n)=1 otherwise, where $\mathcal{N}$ indicates the positions that satisfy some conditions (e.g., a portion of the sensing RS that coincides with another RS or a physical channel transmission and/or reception). In this case, the introduction of weighting may nullify and/or mute portions of the sensing RS (e.g., where the sensing RS coincides with another transmission which should not be interfered or interrupted).

In certain embodiments, an indication of a weighting pattern is done implicitly by defining some constraints on a sensing RS relative to an already known RS pattern. In some embodiments, $w(n)=a, n \in \mathcal{N}$, and w(n)=1 (or w(n)=b) otherwise, where $\mathcal{N}$ indicates the portion of the sensing RS elements or the positions that satisfy some condition (e.g., the portion of the RS that is needed to be transmitted with a higher and/or lower transmit power and hence amplified and a, b indicate the amplification factors). An example of this application is depicted in FIG. 9, where the power of the REs located at the edge of a block are reduced, and the power of the intermediate REs are amplified, with the goal of reducing the inter frequency domain block leakage if the receiver associated with the different resources are not sufficiently spatially isolated.

Figure 9:
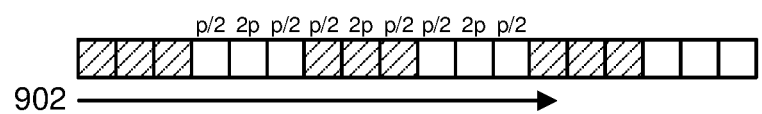
FIG. 9 is a schematic block diagram illustrating one embodiment of power adjustment.

FIG. 9 is a schematic block diagram 900 illustrating one embodiment of power adjustment over a frequency 902. The shaded resources correspond to a first beam, while the unshaded resources correspond to a second beam. The power adjustment is configured to reduce inter-RE leakage. The "p/2" indicates that the symbol is transmitted with half power, whereas "2p" indicates that the symbol is transmitted with double power (e.g., power-boosted).

In various embodiments, there may be sequence separation via range and/or speed displacement or orthogonalization. In certain embodiments, $w(n)=e^{j2\pi\alpha n}$ applies an additional phase rotation pattern along a frequency axis within a sequence. In some embodiments, a phase rotation is proportional to a frequency displacement of an RE within the sensing RS from a reference RE (e.g., $w(n)=e^{j2\pi\phi n}$, where $e^{j2\pi\alpha n}$ is proportional to a frequency displacement from the RE associated with $F_{init}$ (FIG. 10 is an example).

Figure 10:
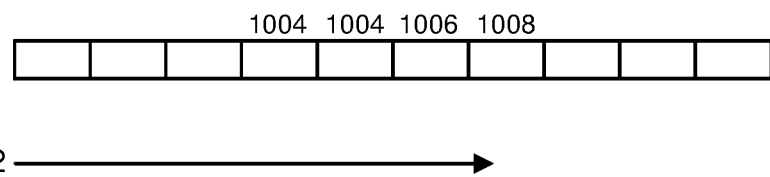
FIG. 10 is a schematic block diagram illustrating one embodiment of a phase rotation pattern.

FIG. 10 is a schematic block diagram 1000 illustrating one embodiment of a phase rotation pattern over a frequency 1002, resulting in a displacement in a range estimation. A first displacement 1004 (e.g., $Xe^{j2\pi(l-1)n}$) a second displacement 1006 (e.g., $Xe^{j2\pi l n}$), a third displacement 1008 (e.g., $Xe^{j2\pi(l+1)n}$) and a fourth displacement 1010 (e.g., $Xe^{j2\pi(l+2)n}$) are illustrated.

In various embodiments, a sequence with phase rotation is applied, where the phase rotation is proportional to the time-displacement of the symbol to a known time-domain location, e.g., $w(n)=e^{j2\pi\phi_n}$, where $\phi_n$ is proportional to the time displacement from the symbol associated with $T_{init}$, resulting in a speed estimate displacement. In certain embodiments, a weighting pattern is applied including a phase rotation, where the phase rotation is proportional to a combination of time and frequency displacement from an initial position associated with $T_{init}, F_{init}$. In some embodiments, a phase rotation pattern is defined via a parameter defining the time-domain phase rotation, a parameter defining the frequency-domain phase rotation, a parameter defining a joint time-frequency phase rotation, or a combination thereof. In various embodiments, rotation defining parameters in time domain, frequency domain, or jointly in time and frequency domain are determined using a secret and/or specific parameter known to the UE (e.g., a shared secret key with UE, or a radio network temporary identifier ("RNTI") known to UE), or known to a group of UEs.

In certain embodiments, a weighting pattern is extended to a time-frequency filter, where the sequence is generated as $r(n)=a_{tx} \sum_m w(n,m)\tilde{r}_{L,u,v}(m)$, where the w(n, m) is defined via an index from a codebook, and the codebook includes possible time-frequency filter combinations.

In some embodiments, if multiple sensing RS share the same time and/or frequency resource, multiple adjacent REs and/or symbols are considered to constitute an orthogonal code block for co-existing sensing RSs. The code block may include a number of adjacent REs, an number of adjacent symbols, or a number of REs and adjacent symbols constituting a continuous block.

In various embodiments, that may be a parametric base sequence definition. In certain embodiments, $\tilde{r}_{L,u,v}$ is a Zadoff Chu sequence, where the parameter L correspond to the sequence length, and the parameters u, v, jointly or separately define the Zadoff-Chu root sequence as well as the sequence shift. In some embodiments, $\tilde{r}_{L,u,v}$ is a gold sequence where the parameters u, v define initialization strategy to generate the sequence. In various embodiments, $\tilde{r}_{L,u,v}$ is a pseudo-random sequence where the parameters u, v define the sequence from the apriori-known sequence set and/or codebook. In certain embodiments, sequence defining parameters u, v or a sub-set and/or combination thereof are calculated from a shared secret value that is known only to a sensing TX and sensing RX nodes, or it is known only to a subset of the network entities or UEs.

In some embodiments, a signal sequence is generated via a weighted sum of multiple pre-defined sequences, where the weight combinations or a quantized version of the possible weight combinations are used as the sequence defining parameters.

In various embodiments described herein, sequence defining parameters (e.g., the total amplification a, u, v, $w_i(n)$, $a_{tx,i}$ or any subset of such parameters), jointly or individually defined via an index from a codebook, where the codebook includes the potential values of the parameters (e.g., individually, or jointly when the codebook is defined over multiple parameters).

In certain embodiments, if data or a physical channel is used as a sensing RS, the content of the physical channel may be considered part of a signal sequence.

In some embodiments, a signal sequence is generated similar to that of an existing reference signal (e.g., the UL SRS sequence, DL CSI-RS sequence, PT-RS or DMRS sequence belonging to one of the active and/or known physical channels). In various embodiments, a signal sequence is generated via the repetition of an existing reference signal, or via the (e.g., potentially weighted, amplified, and/or rotated) combination and/or concatenation of multiple (e.g., potentially different) previously defined sensing signal sequence or other RS belonging to other physical channels.

In certain embodiments, there may be a partially unknown sequence to a sensing RX. In such embodiments, the sequence is defined and/or known only partially to the sensing RX. Thus, the sensing Rx may be expected to perform a pre-detection phase where the sequence is detected among a set of possible sequences. In some embodiments, a set of possible sequences is defined via a parameter, a parameter range, or a parameter value set, where the parameter represents any of the parametric definitions stated within any embodiment described herein. In various embodiments, a set of possible sequences is defined via an index from a codebook, where the codebook includes a possible set of sequences. In certain embodiments, a sequence to be detected carries information to be used by a sensing RX.

In a fifth embodiment, there may be a mapping to sensing RS physical resources. According to this embodiment, a constructed symbol and/or value sequence for a sensing RS is mapped to time and/or frequency resources associated with the sensing RS according to a mapping pattern.

In some embodiments, there may be an initial symbol mapping. In various embodiments, a first sequence value is mapped to a first symbol of a first sensing slot (e.g., in the time domain) and a first RE in a first sensing RB (e.g., in a frequency domain). In certain embodiments, a first sequence value is mapped into a time and/or frequency position identified as $T_{init}, F_{init}$, or to a time and/or frequency position with a known relative time and/or frequency distance to the position identified by $T_{init}, F_{init}$.

Figure 11:
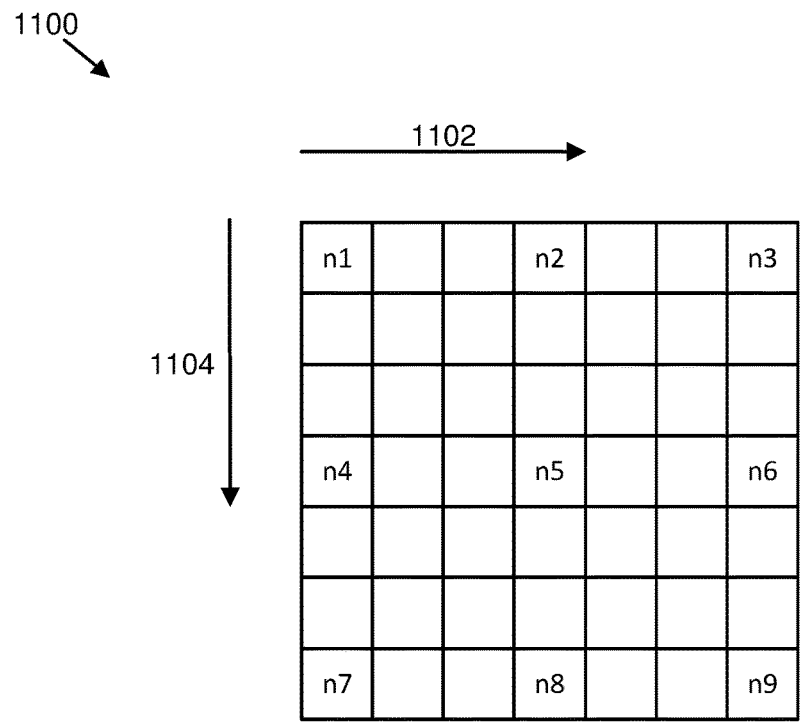
FIG. 11 is a schematic block diagram illustrating one embodiment of resource mapping.

In various embodiments, there may be a mapping with time and/or frequency axis prioritization. In certain embodiments, a sensing RS resource mapping is done such that a value, following a previous value within, in a generated sequence, is placed at a subsequent (e.g., compared to the previously mapped position) symbol that belongs to the sensing RS in the time domain, or, if the symbol does not exist, it is placed at a subsequent RE and/or subcarrier that belongs to the sensing RS and located at a first time-domain symbol within the sensing RS. This mapping is exemplified in FIG. 11. FIG. 11 is a schematic block diagram illustrating one embodiment of resource mapping 1100 across a time domain 1102 and a frequency domain 1104 with time-domain priority.

Figure 12:
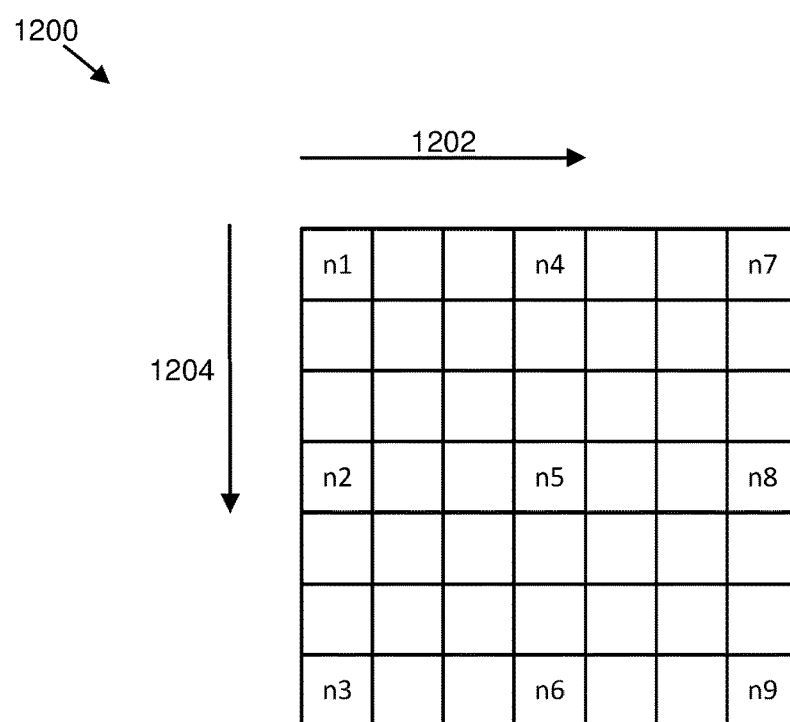
FIG. 12 is a schematic block diagram illustrating another embodiment of resource mapping.

In some embodiments, a sensing RS resource mapping is done such that a next value in a generated sequence is placed at a subsequent subcarrier and/or RE (e.g., in the frequency domain) located at the same time domain symbol as the previous sequence member, or, if the symbol and/or position does not exist, at the subsequent time-domain symbol located at the first RE and/or subcarrier within the sensing RS. This mapping is exemplified in FIG. 12. FIG. 12 is a schematic block diagram illustrating another embodiment of resource mapping 1200 across a time domain 1202 and a frequency domain 1204 frequency domain priority.

Figure 13:
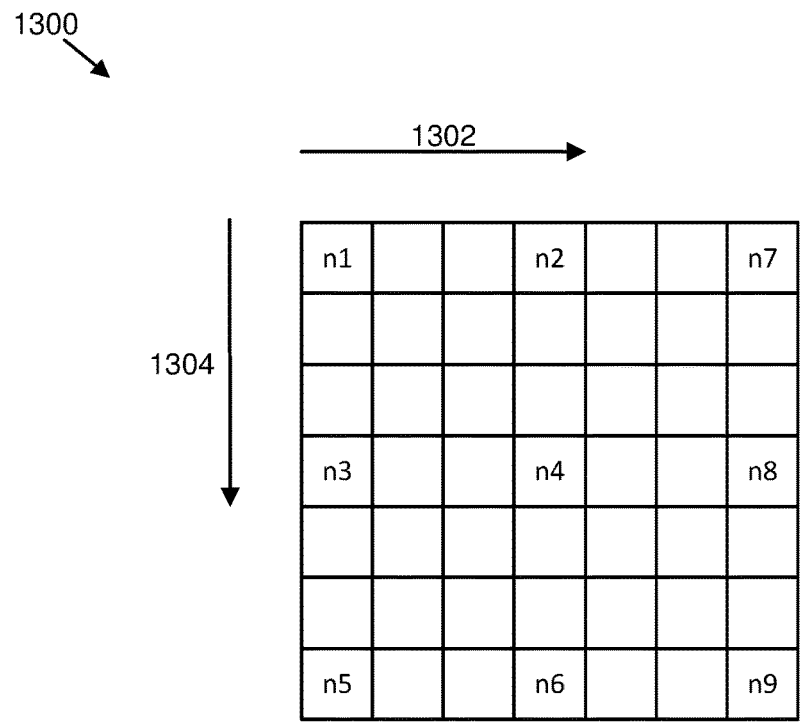
FIG. 13 is a schematic block diagram illustrating a further embodiment of resource mapping.
Figure 14:
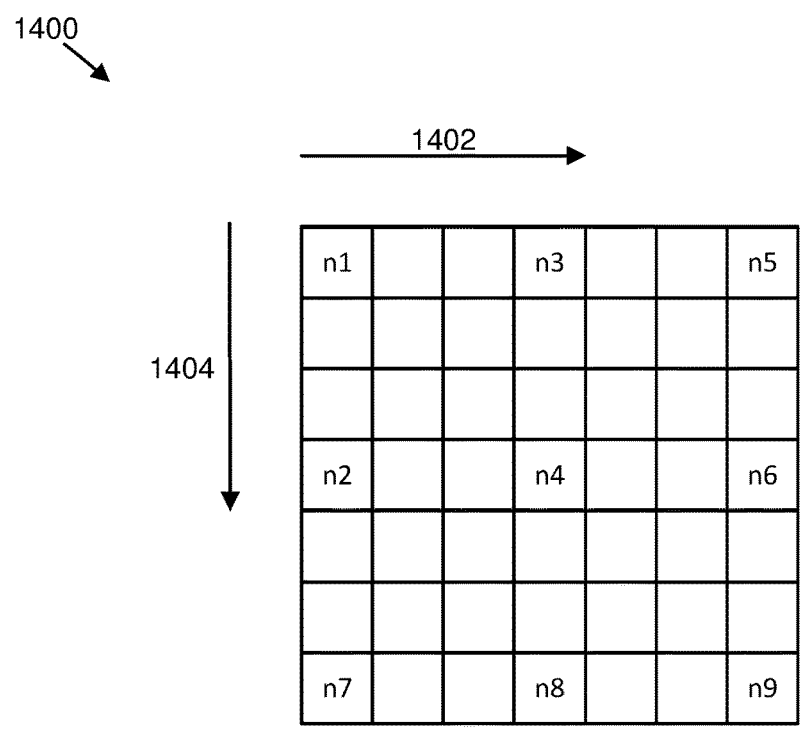
FIG. 14 is a schematic block diagram illustrating yet another embodiment of resource mapping.

In various embodiments, there may be a mapping with a maximum time and/or frequency block length constraint. In certain embodiments, a sensing RS resource mapping is done such that a next value in the generated sequence is placed at a subsequent time domain symbol located at the same frequency domain RE as the previous sequence member, or, if the symbol and/or position exceeds a known value (e.g., a processing maximum block length in time), at the subsequent frequency domain RE located at the first time domain symbol within the sensing RS. This mapping is exemplified in FIG. 13. FIG. 13 is a schematic block diagram illustrating a further embodiment of resource mapping 1300 across a time domain 1302 and a frequency domain 1304 block-wise mapping with time-domain priority. In some embodiments, the sensing RS resource mapping is done such that a next value in the generated sequence is placed at the subsequent frequency domain RE located at the same time-domain symbol as the previous sequence member, or, if the position exceeds a known frequency-domain displacement compared to the first RE (e.g., a processing maximum bandwidth), at the subsequent time-domain symbol located at the first time-domain symbol within the sensing RS. This mapping is exemplified in FIG. 14. FIG. 14 is a schematic block diagram illustrating yet another embodiment of resource mapping 1400 across a time domain 1402 and a frequency domain 1404 block-wise mapping with frequency domain priority.

It should be noted that the used dimension number and sequence length in FIGS. 11 through 14 are intended as an example, and the patterns are envisioned to include the case with extended time and/or frequency domain extensions. Moreover, the depicted resources are plotted in a concatenated manner (e.g., gaps are not depicted), but the time and/or frequency domain resources for which the mapping is intended may include gaps in time domain, frequency domain, or both.

In various embodiments, different parts of a sensing RS may be mapped via different patterns. In certain embodiments, a definition of a mapping type, a time-domain block (e.g., FIG. 13), a frequency domain block (e.g., FIG. 14), or a subset and/or combination thereof may be defined semi-statically via radio resource control ("RRC") signaling, or dynamically (e.g., via a DCI indication).

In some embodiments, a mapping type and/or parameters are implicitly calculated considering some previously configured conditions and/or criterions. In various embodiments, parameters defining or inferred from a sensing RS resource pattern, a sub-set of the parameters defining the sensing RS signal sequence, sensing RS resource mapping parameters, or a combination (or a combination of a subset of the related parameters) thereof are determined with the rest of the parameters together with sensing related capabilities (e.g., when some (or all) of the sensing sequence defining parameters and the mapping type and/or parameters may be determined via the knowledge of the sensing RS pattern together with some previously known configuration and/or parameters. In one example, a mapping type with time axis prioritization is determined with a time domain maximum block size of X symbols (e.g., pattern similar to FIG. 13), where X is indicated as the maximum supported processing and/or memory block for the sensing RX node.

In certain embodiments, a supported configuration and/or parameter combinations for a sensing RS pattern, a supported sensing sequence and/or set of processing associated with a sensing sequence defining parameter, and parameter combination related to mapping are defined (separately or jointly) as part of UE capability parameters.

In a sixth embodiment, there may be a beam and/or spatial filter definition for a sensing RS. In some embodiments, a set of sensing RS defining parameters include parameters defining a spatial beam or set of beams for sensing RS transmission for sensing a TX node. Similarly, in various embodiments, a set of sensing RS defining parameters includes parameters defining a spatial beam or set of beams for sensing RS reception for sensing an RX node. In certain embodiments, a beam defining parameter for a sensing RS includes, but is not limited to, a linear and/or nonlinear transmit and/or receive spatial filter (or a quantized version thereof), an index from a codebook, or parameters as input to a known codebook, where the codebook includes supported spatial filters as a function of the input parameters, the angular pattern information defining the desired beam, or restricting the beam within a subset of the possible spatial filters.

In some embodiments, a sensing RS is transmitted via multiple beams. In various embodiments, multiple beams are transmitting and/or receiving a sensing RS simultaneously. In certain embodiments, part of a sensing RS (e.g., a time and/or frequency resource subset) is transmitted and/or received via one antenna port and/or beam or one set of beams, whereas another part of the sensing RS is transmitted and/or received from another antenna port and/or beam or another set of beams. In some embodiments, a separation of time and/or frequency resources of sensing RS for transmission over different beams is defined via a sequence of parameterization found herein or extending a previously introduced parameterization with a beam-indicating parameter, or by augmenting beam patterns within a sensing RS and/or within a sensing RS to defining codebook described herein.

In various embodiments, if multiple beams are indicated for transmission (or multiple beams are indicated for the reception), potentially together with an associated time and/or frequency pattern of the sensing RS, beam-defining parameters may be defined in relation to a previous beam or a previous set of beams. In certain embodiments, if a beam-definition is done via angular pattern information, a specific angular rotation and/or displacement may be indicated to define beams. In some embodiment, a beam is defined with a weighted combination of previously defined beams superimposed with an additionally defined beam (e.g., via an index from a codebook).

In certain embodiments, a beam of a sensing RS (e.g., QCL type-D assumption) is determined based on associated DMRS within a slot. The associated DMRS may be either for physical downlink shared channel ("PDSCH") for a PDSCH transmission within the same slot, or the associated DMRS may be for physical downlink control channel ("PDCCH") for a PDCCH transmission within the same slot or the associated DMRS may for physical uplink shared channel ("PUSCH") for PUSCH transmission within the same slot. In there is no association with a beam of other DMRS, explicit QCL assumption may be needed for transmission and/or reception of a sensing RS.

In various embodiments, a QCL assumption for periodic and/or semi-persistent sensing RS may be configured for each sensing RS resource RRC configuration. For an aperiodic sensing RS, a dynamic transmission configuration indicator ("TCI") indication, explicitly for sensing RS is transmitted in scheduling and/or activation DCI for the sensing RS.

In a seventh embodiment, there may be a flexible CP overhead configuration. In such an embodiment, a set of sensing RS defining parameters include parameters defining CP overhead, or a waveform type at specific time domain occasions within the sensing RS. In certain embodiments, a CP overhead or waveform type (or multiple and/or subset of the parameters) is used within the symbols within a sensing RS, which is different from that of the other symbols.

In some embodiments, parameters may differ within the same sensing RS (e.g., a subset of the symbols within a sensing RS uses one CP overhead whereas another subset uses another (e.g., different) CP overhead).

In various embodiments, parameters include additional (e.g., one or multiple) time domain patterns defined via embodiments described herein, where the patterns define common values for overhead or a waveform type within symbols belonging to such patterns.

In certain embodiments, a UE receives at least one configuration of periodically, semi-persistently, or aperiodically (e.g., based on triggering) occurring time intervals (e.g., a slot, a set of slots, a subframe), where an extended CP is used in an orthogonal frequency demodulation ("OFDM") and/or DFT-S-OFDM symbol and one or more sensing RS resources are configured. The one or more sensing RS resources configured in time intervals include a first sensing RS to be transmitted by a UE, a second sensing RS to be received by the UE, and/or a zero-power sensing RS for which the UE performs rate-matching. In one example, each of the configured time intervals includes a smaller number of OFDM and/or DFT-S-OFDM symbols per slot than other slots.

In some embodiments, at least one configuration of time-intervals is a part of a sensing RS configuration. In various embodiments, at least one configuration of time intervals is included in a DL or UL bandwidth part ("BWP") configuration.

In various embodiments, there may be different aspects for a time and/or frequency pattern definition. In certain embodiments, values of the any of $L_T$ and/or $\Delta_T$ are expressed in terms of a number of slots and/or subframes or a duration corresponding to a number of a symbol, a symbol and/or slot-independent time duration value (e.g., X msec). In some embodiments, values of the any of $L_T$ and/or $\Delta_T$ are defined via an index from a codebook, where the codebook includes the supported values for $L_T$ and/or $\Delta_T$, separately or jointly.

In various embodiments, values of any of the $L_F$ and/or $\Delta_F$ are expressed in terms of an SCS-independent bandwidth value (e.g., 120 kHz), a number of RBs or a bandwidth corresponding to a number of REs. In certain embodiments, values of the any of $L_F$ and/or $\Delta_F$ may be defined via an index from a codebook, where the codebook includes the supported values for $L_F$ and/or $\Delta_F$, separately or jointly.

In some embodiments, possible time domain sensing signal locations are restricted to a subset of symbols within the slot (e.g., a pre-defined time domain pattern or the symbols not conflicting with the CORESET in the beginning of the slot and/or DMRS type-A symbols). In such embodiments, restricted symbols may be excluded in measuring values of any of $L_T$, $\Delta_T$. In various embodiments, values of $L_T$, $\Delta_T$ only hold a subset of feasible values (e.g., powers of 2 or values with a known step-size). In certain embodiments, parameters specifying time domain allocations (e.g., any of $L_T$, $\Delta_T$ or both of $L_T$, $\Delta_T$ jointly) are defined with an index from a pre-known codebook. The codebook for possible time domain allocations may be constructed via an a priori known requirement set on a potential object mobility pattern (e.g., maximum speed and/or speed resolution) considering the SCS and the available bandwidth. In some embodiments, a time domain pattern of a sensing RS is defined and/or indicated via an index from a known codebook, to where the codebook contains time domain RS patterns. In various embodiments, a time domain pattern corresponds to different time domain sensing requirements (e.g., time domain radar processing gain, maximum resolvable object speed range, achievable speed resolution), see Table 1. In certain embodiments, time-domain patterns within a codebook do not necessarily comply with a parametric RS pattern definition.

In some embodiments, if a block of information is repeated for multiple separate receivers, for the same receiver, or a combination thereof, a repetition pattern and associated resources and beams are indicated to be used as a sensing RS to sensing RX nodes. In various embodiments, indicated sensing RX nodes may be required to store a received baseband signal sequence to be later used to enhance sensing processing.

TABLE 1

Example codebook for time domain sensing RS pattern definition for SCS = 240 kHz, normal CP @ 28 GHz. Radar processing gain is considered as the number of REs for sensing RS

| Index | $\Delta_T$ | $L_T$ | Other sensing RS parameters | Maximum Velocity | Velocity Resolution | Proc. Gain (time domain) |
|---|---|---|---|---|---|---|
| 1 | 14 symbols | 2 msec | . . . | 308 km/h | 10 km/h | 32 |
| 2 | 28 symbols | 10 msec | . . . | 154 km/h | 2 km/h | 80 |
| 3 | 14 symbols | 10 msec | . . . | 308 km/h | 2 km/h | 160 |
| . . . | . . . | . . . | | . . . | . . . | . . . |

Table 2 includes examples of the sensing RS time domain pattern definition. Example #1 in Table 2 indicates a case where the time domain pattern is defined via a combination of a sensing RS symbol pattern within a slot, and a pattern for the sensing RS containing slots. Another similar example may be constructed, if the symbol pattern is defined for a time block of two and/or multiple slots, and $\{T_{slot-init}, \Delta_{slot}, L_{slot}\}=1,1,4$ define the inter time-block pattern. Example #2 in Table 2 indicates a case where two parameter sets are used where the time domain pattern is constructed by combining the defined patterns via superposition (e.g., pattern consisting of symbols belonging to at least one of the defined patterns). Other variations of this example may be when a combination is done via pattern subtraction (e.g., excluding time domain locations of a second pattern from the first pattern), or intersection (e.g., pattern including the symbols that belong to two or more patterns simultaneously). Example #3 in Table 2 indicates a pattern where the symbol pattern within a slot is defined similar to that of Example #1, whereas an inter-slot pattern is defined directly via the set of sensing slot indices. Example #4 of Table 2 indicates a pattern where the symbol pattern within a slot is defined directly via a set of the symbol indices, whereas the inter-slot pattern is defined via a similar parameterization as in Example #1. A codebook defining the time-domain pattern may include elements constructed via any or multiple of the pattern-defining methods within this disclosure.

Table 3 includes examples of the sensing RS frequency-domain pattern definition. Example #1 of Table 3 indicates the case where a frequency domain pattern is defined via a combination of the sensing RS RE pattern within a RB, and a pattern for the sensing RS-containing RBs along the frequency axis. Another similar example may be constructed, when the symbol pattern is defined for a frequency block of two and/or multiple RBs, and $\{F_{RB-init}, \Delta_{RB}, L_{RB}\}=1,1,4$ define the inter RB pattern. Example #2 of Table 3 indicates the case where two parameter sets are used where the frequency domain pattern is constructed by combining defined patterns via superposition. Other variations of this example are possible if a combination is done via pattern subtraction, or intersection. Example #3 of Table 3 indicates a pattern where the RE pattern within a RB is defined similar to that of the Example #1 of Table 3, whereas the inter-RB pattern is defined directly via the set of sensing RB indices. Example #4 of Table 3 indicates a pattern where the symbol pattern within a slot is defined directly via the set of the symbol indices, whereas the inter-RB pattern is defined via a similar parameterization as in Example #1 of Table 3. A codebook defining the frequency domain pattern may include elements constructed via any or multiple of the pattern defining methods within this disclosure.

TABLE 2

Examples for time-domain sensing RS pattern definition

| Example no. | Time domain pattern definition | Other sensing RS parameters |
|---|---|---|
| #1 | $\{T_{slot-init}, \Delta_{slot}, L_{slot}\}$ 1,1,4, $(T_{init}, L_T, \Delta_T) = 2,2.2$ | . . . |
| #2 | $\{T_{slot-init}, \Delta_{slot}, L_{slot}\} = \{1,1,4\}, \{2,2,16\},$ $\{T_{init}, L_T, \Delta_T\} = 2,2,2,4,1,1$ | |
| #3 | $l_{slot} = \{1,3,5,6,7,9\}, \{T_{init}, L_T, \Delta_T\} = 2,2,2$ | |
| #4 | $\{T_{slot-init}, \Delta_{slot}, L_{slot}\} = 1,1,4, 1 = \{2,3\}$ | |

TABLE 3

Examples for frequency domain sensing RS pattern definition

| Index/ Example | Frequency domain pattern definition | Other sensing RS parameters |
|---|---|---|
| #1 | $\{F_{RB-init}, \Delta_{RB}, L_{Rb}\} = 1,1,4,$ $(F_{init}, L_F, \Delta_F) = 2,2,2$ | . . . |
| #2 | $\{F_{RB-init}, \Delta_{RB}, L_{RB}\} = \{1,1,4\},\{2,2,16\},$ $\{F_{init}, L_F, \Delta_F\} = 2,2,2,4,1,1$ | |
| #3 | $k_{RB} = \{1,3,5,6,7,9\},$ $\{F_{init}, L_F, \Delta_F\} = 2,2,2$ | |
| #4 | $\{F_{RB-init}, \Delta_{RB}, L_{RB}\} = 1,1,4,$ $k = 2,3$ | |

In some embodiments, frequency domain sensing signal locations are restricted to a subset of RBs and/or REs within the BWP (e.g., the symbols not conflicting with a prior semi-static allocation or other reference signals). In such embodiment, restricted RBs/REs are excluded in measuring the values of $L_F$, $\Delta_F$. In various embodiments, the values of $L_F$, $\Delta_F$ only hold a subset of feasible values (e.g., the powers of 2 or the values with the step size of, e.g., 1,2,4,7, for $\Delta_F$). In certain embodiments, a frequency domain pattern of a sensing RS is defined and/or indicated via to an index from a known codebook.

In some embodiments, a codebook contains frequency domain RS patterns corresponding to different frequency domain sensing requirements (e.g., frequency domain radar processing gain, maximum resolvable object distance, achievable distance resolution). In various embodiments, frequency domain patterns within the codebook do not necessarily comply with a parametric RS pattern definition.

In certain embodiments, a joint time and frequency domain pattern of a sensing RS is defined and/or indicated via an index from a known codebook, where the codebook contains time and/or frequency domain RS patterns corresponding to different sensing requirements (e.g., radar processing gain, maximum resolvable object distance, achievable distance resolution, maximum resolvable object speed range, achievable speed resolution).

In some embodiments, if a codebook based definition is used for at least one sensing RS pattern parameters, at least one index representing a type of the used codebook (corresponding to the codebook-based defined parameter) is also indicated.

In various embodiments, pre-configured sensing RS patterns are defined in terms of a time and/or frequency domain pattern within a slot, and a UE may be configured and/or indicated by a network to apply one of a pre-configured RS pattern. In certain embodiments, a sensing RS is transmitted using a single antenna port and the antenna port is associated with a DMRS port. If no explicit association is indicated, then the sensing RS port is associated with a lowest DMRS port index.

In some embodiments, a sensing RS may be either semi-persistent, periodic, or aperiodic. When the sensing RS is periodic, one of the pre-configured sensing RS is indicated, the period duration is indicated, the presence and/or absence of sensing RS in the slots within the period is indicated. Based on this, the sensing RS configuration within the period is determined. For a periodic sensing RS configuration, the transmission and/or reception continues, as long as the periodic sensing RS configuration is not released. When a sensing RS is semi-persistent, then one of the pre-configured sensing RS is indicated, the period duration is indicated, the presence and/or absence of sensing RS in the slots within the period is indicated, and the transmission starts after explicit triggering in the DCI. The transmission stops after explicit deactivation. If the sensing RS is aperiodic, then the DCI indicates a one-shot transmission and repetition, if needed.

Figure 15:
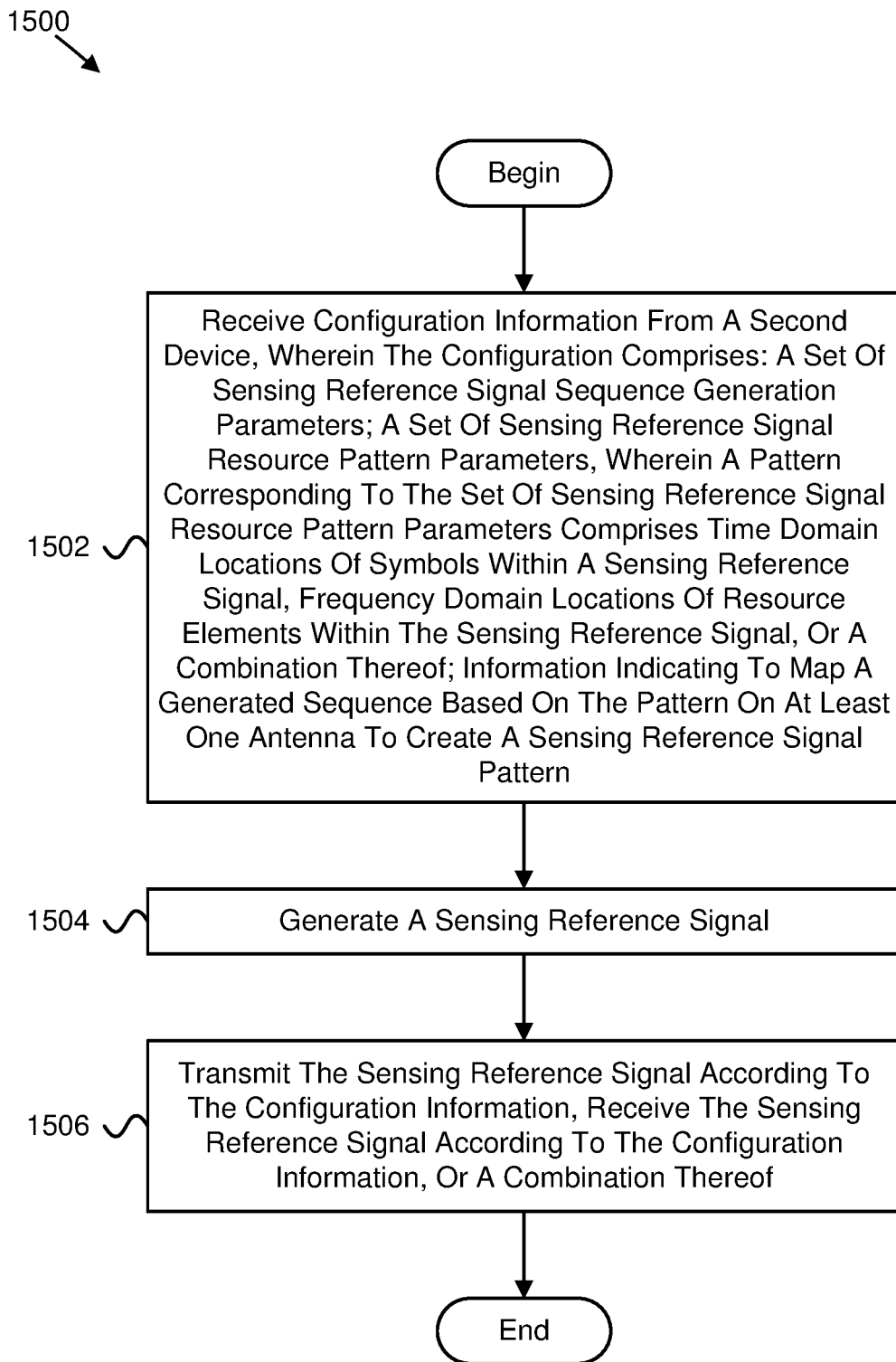
FIG. 15 is a flow chart diagram illustrating one embodiment of a method for configuring a sensing reference signal.

FIG. 15 is a flow chart diagram illustrating one embodiment of a method 1500 for configuring a sensing reference signal. In some embodiments, the method 1500 is performed by an apparatus, such as the network unit 104. In certain embodiments, the method 1500 may be performed by a processor executing program code, for example, a microcontroller, a microprocessor, a CPU, a GPU, an auxiliary processing unit, a FPGA, or the like.

In various embodiments, the method 1500 includes receiving 1502, at a first device, configuration information from a second device. The configuration includes: a set of sensing reference signal sequence generation parameters; a set of sensing reference signal resource pattern parameters, wherein a pattern corresponding to the set of sensing reference signal resource pattern parameters includes time domain locations of symbols within a sensing reference signal, frequency domain locations of resource elements within the sensing reference signal, or a combination thereof; and information indicating to map a generated sequence based on the pattern on at least one antenna to create a sensing reference signal pattern. In some embodiments, the method 1500 includes generating 1504 a sensing reference signal. In certain embodiments, the method 1500 includes transmitting 1506 the sensing reference signal according to the configuration information, receiving the sensing reference signal according to the configuration information, or a combination thereof.

In certain embodiments, a time domain resource pattern corresponding to the pattern comprises: a parameter defining a time block; a parameter defining a first symbol location belonging to the sensing reference signal within a radio frame; a parameter defining the first symbol location belonging to the sensing reference signal within a slot or within the time block; a parameter defining a first slot or the time block including at least a portion of the sensing reference signal; a parameter defining a number of symbols belonging to the sensing reference signal; a parameter defining a time duration in which the sensing reference signal is present; a parameter defining a number of slots or a number of time blocks that contain at least one element of the sensing reference signal; a parameter defining the number of symbols belonging to the sensing reference signal within a slot, or a time block; a parameter defining a distance between two consecutive sensing reference signal symbols within a slot, or a time block; a parameter defining a distance between two consecutive slots, or two consecutive time blocks belonging to a sensing reference signal; or some combination thereof.

In some embodiments, the time domain resource pattern is at least partly defined via an index from a mapping table, and the mapping table defines: sensing reference signal symbol time domain positions; sensing reference signal symbol positions within a slot, a time block, or a combination thereof; sensing reference signal slots, sensing reference signal time block positions, or a combination thereof containing sensing reference signal elements; or some combination thereof.

In various embodiments, a frequency domain resource pattern of the pattern comprises: a parameter defining a frequency block; a parameter defining a first resource element location belonging to the sensing reference signal within a bandwidth part; a parameter defining the first resource element location belonging to the sensing reference signal within a resource block or within a defined frequency block; a parameter defining a first resource block or frequency block including a sensing reference signal element; a parameter defining a number of resource elements belonging to the sensing reference signal; a parameter defining a bandwidth in which the sensing reference signal is present along a frequency axis; a parameter defining a number of resource blocks, or a number of frequency blocks that contain at least one element of the sensing reference signal; a parameter defining a number of resource elements belonging to the sensing reference signal within a resource block, or a frequency block; a parameter defining a distance between two consecutive sensing reference signal resource elements along a frequency domain within a resource block, or a frequency block; a parameter defining a distance between two consecutive resource blocks, or frequency blocks belonging to the sensing reference signal; or some combination thereof.

In one embodiment, the frequency domain resource pattern is at least partially defined via an index from a mapping table, wherein the mapping table defines: sensing reference signal resource element positions along a frequency axis; sensing reference signal resource element positions within a resource block, a frequency block, or a combination thereof; sensing reference signal resource block, frequency block positions, or a combination thereof containing sensing reference signal elements; or some combination thereof.

In certain embodiments, the pattern comprises a frequency domain hopping configuration, and the frequency domain hopping configuration comprises: at least two frequency domain patterns; a frequency domain pattern modification; a time domain pattern wherein an alternate frequency domain pattern or a pattern modifications takes place; a frequency domain hopping pattern defined via an index from a codebook, wherein the codebook defines frequency domain hopping patterns; or some combination thereof.

In some embodiments, a joint time and frequency domain sensing reference signal resource pattern corresponding to the pattern is at least partly defined via an index from a mapping table, wherein the mapping table defines: sensing reference signal resource element positions jointly along a time and frequency axis; sensing reference signal resource element positions within a time frequency resource plain corresponding to a resource block, a frequency block, a slot, a time block, or some combination thereof; a joint time and frequency position of sensing reference signal time frequency resource planes; or some combination thereof.

In various embodiments, the configuration information further comprises: at least one time domain pattern as a subset of the sensing reference signal pattern along a time domain, wherein symbol locations belonging to the time domain pattern follow an alternate cyclic prefix overhead; at least one cyclic prefix overhead parameter corresponding to an indicated time domain pattern; or a combination thereof.

In one embodiment, at least one of the sensing reference signal parameters is defined via: an indication of a first previously defined reference signal or a reference signal parameter; an indication of a second previously defined reference signal; at least one sensing reference signal parameter or at least one modified parameter; a combination type, wherein the combination type is used to generate a new reference signal parameter based on previously defined reference signals or reference signal parameters; or a combination thereof.

In certain embodiments, the previously defined reference signal comprises a downlink preference signal, a downlink channel state information reference signal, an uplink preference signal, a downlink demodulation reference signal, an uplink demodulation reference signal, a downlink phase tracking reference signal, an uplink phase tracking reference signal, or some combination thereof.

In some embodiments, a combination type among two resource patterns defined in a time domain, in a frequency domain, or in the time domain and the frequency domain is defined as: a displaced version of a first pattern based on a first displacement parameter; a displaced version of a second pattern based on a second displacement parameter; a concatenation of the first pattern with the second pattern in the time domain, in the frequency domain, or in the time domain and the frequency domain with a defined distance based on a third displacement parameter; a union of the first pattern with the second pattern; an intersection of the first pattern with the second pattern; a subtraction of the second pattern from the first pattern; or some combination thereof.

In various embodiments, a combination type among a first resource pattern defined in a time domain, a frequency domain, or in the time domain and the frequency domain and a second resource pattern defined in the time domain, the frequency domain, or in the time domain and the frequency domain, or a combination thereof is defined as: a displaced version of the first resource pattern based on a displacement parameter; a repetition of the first resource pattern along the time domain based on a first repetition parameter set; a repetition of the first resource pattern along the frequency domain based on a second repetition parameter set; a repetition of the first resource pattern along the time domain and the frequency domain based on a third repetition parameter set; a repetition of the first resource pattern according to the second resource pattern; or some combination thereof.

In one embodiment, a combination type among a sensing reference signal parameter and a second parameter comprises calculating an operation among the sensing reference signal parameter and the second parameter. In certain embodiments, a time frequency resource pattern of the sensing reference signal is defined according to a previously defined reference signal and a repetition pattern, and the sequence generation and sequence-to-resource mapping procedure for the sensing reference signal is defined via: redefining the sensing reference signal sequence and mapping according to the time frequency resource pattern; repetition of the reference signal sequence within a repeated resource pattern; or a combination thereof.

In some embodiments, the method 1500 further comprises a computation stage, a search stage, or a combination thereof at the first device if a subset of the sensing reference signal resource pattern parameters are not defined. In various embodiments, the method 1500 further comprises receiving additional configuration information defining a superset of the sensing reference signal resource pattern parameters. In one embodiment, the method 1500 further comprises receiving additional configuration information from the second device, wherein the additional configuration information defines a criterion for computing, selecting, or a combination thereof of remaining sensing reference signal pattern parameters.

In certain embodiments, the method 1500 further comprises receiving additional configuration information indicating an application for recovered information from sensing reference signal pattern parameters. In some embodiments, the method 1500 further comprises a computation stage, a search stage, or a combination thereof at the first device if a subset of the sensing reference signal sequence parameters are not defined. In various embodiments, the method 1500 further comprises: receiving a configuration defining a superset of the sensing reference signal sequence parameters; receiving additional configuration information defining a criterion for computing, selecting, or a combination thereof the remaining sensing reference signal sequence parameters; or a combination thereof.

In one embodiment, the method 1500 further comprises receiving additional configuration information indicating an application for recovered information. In certain embodiments, a signal sequence for the sensing reference signal is defined via a set of parameters indicating: a type, an index, or a combination thereof of a root sequence of a Zadoff-Chu sequence; a length of the Zadoff-Chu sequence; a sequence shift of the Zadoff-Chu sequence; or some combination thereof.

In some embodiments, a signal for the sensing reference signal is defined via a set of parameters indicating: a sequence used as an initialization of a sequence generator for a Gold binary sequence; a length of the Gold binary sequence; a binary-to-complex-value transformation for a generated binary sequence; or some combination thereof. In various embodiments, a signal sequence for the sensing reference signal is defined via: an indication of an a priori defined sequence; an indication of a portion of the a priori defined sequence; an indication of a repetition of the a priori defined sequence or a portion thereof; or some combination thereof.

In one embodiment, generation of the signal sequence comprises a scrambling or an encryption according to: a number computed from a secret key known only by a network; a number computed from the secret key known by the network and the first device; a radio network temporary identifier known by the first device; a group common radio network temporary identifier; or some combination thereof. In certain embodiments, the information indicating to map the generated sequence further comprises: prioritization along a time domain; prioritization along a frequency domain; a block length along the time domain; a block length along the frequency domain; an index from a codebook, wherein the codebook defines a mapping strategy; or some combination thereof.

In some embodiments, the information indicating to map the generated sequence further comprises: a definition of a code block group pattern along a time domain, a frequency domain, or a combination thereof; a definition of orthogonal sequences within each code block group is assigned to a sensing reference signal; a definition of mapping a sequence value to a corresponding code block group; or a combination thereof. In various embodiments, the orthogonal sequences are defined via an index from a codebook, or via a parameterization comprising: a time domain length, a frequency domain length, a total block size in number of resource elements, or a combination thereof; a type of the orthogonal sequence; or a combination thereof.

In some embodiments, the information indicating to map the generated sequence further comprises: a definition of a harmonic multiplication along a time domain for the sensing reference signal; a definition of the harmonic multiplication along a frequency domain for the sensing reference signal; a definition of the harmonic multiplication along the time domain and the frequency domain for the sensing reference signal; a definition of a linear time, a frequency filter, or a combination thereof applied to a sensing reference signal sequence value; or some combination thereof.

In one embodiment, the information indicating to map the generated sequence further comprises a power adjustment pattern along a time domain, along a frequency axis, or along the time domain and the frequency axis. In certain embodiments, a first subset of the sensing reference signal parameters is defined via a first previously defined reference signal or a first defined parameter set, and a second subset of the sensing reference signal parameters is defined via a second previously defined reference signal or second defined parameter set.

Figure 16:
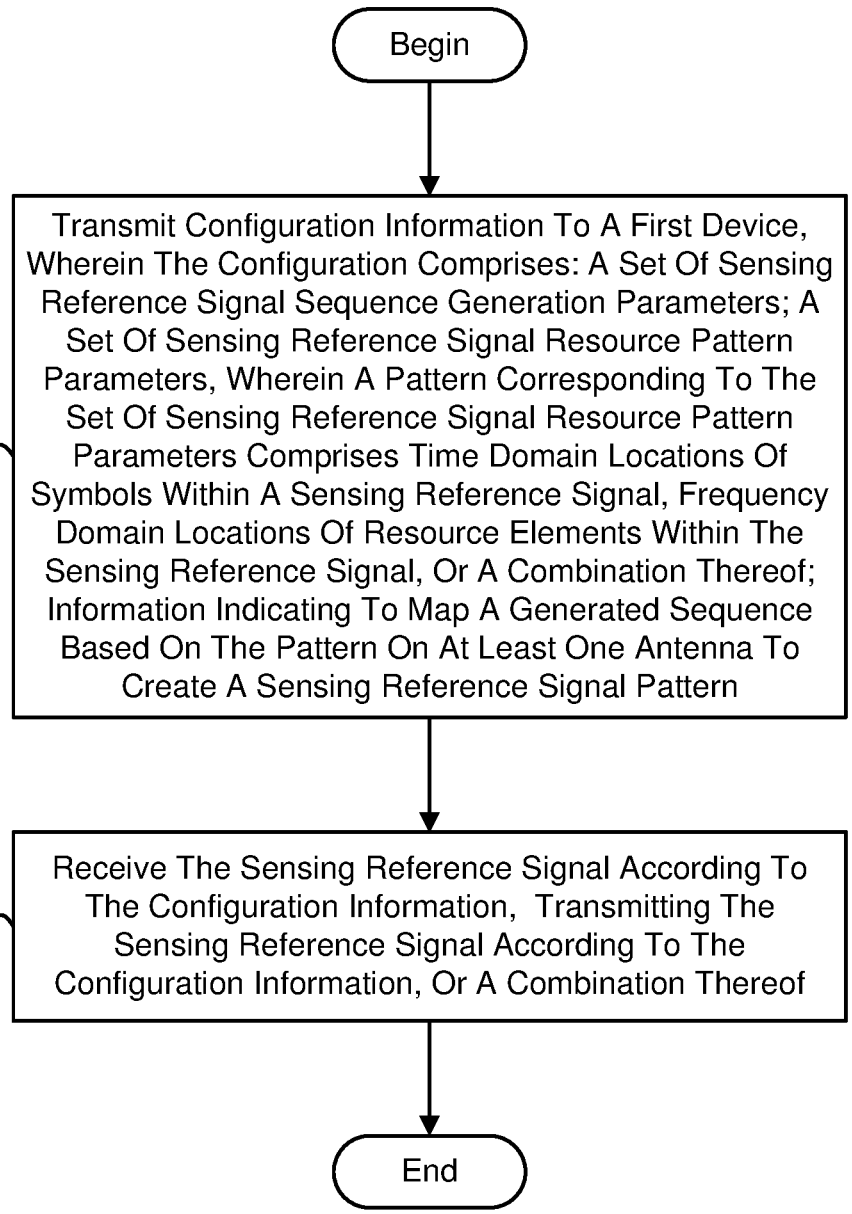
FIG. 16 is a flow chart diagram illustrating another embodiment of a method for configuring a sensing reference signal.

FIG. 16 is a flow chart diagram illustrating another embodiment of a method 1600 for configuring a sensing reference signal. In some embodiments, the method 1600 is performed by an apparatus, such as the network unit 104. In certain embodiments, the method 1600 may be performed by a processor executing program code, for example, a microcontroller, a microprocessor, a CPU, a GPU, an auxiliary processing unit, a FPGA, or the like.

In various embodiments, the method 1600 includes transmitting 1602, from a second device, configuration information to a first device. The configuration includes: a set of sensing reference signal sequence generation parameters; a set of sensing reference signal resource pattern parameters, wherein a pattern corresponding to the set of sensing reference signal resource pattern parameters includes time domain locations of symbols within a sensing reference signal, frequency domain locations of resource elements within the sensing reference signal, or a combination thereof; and information indicating to map a generated sequence based on the pattern on at least one antenna to create a sensing reference signal pattern. In certain embodiments, the method 1600 includes receiving 1604 the sensing reference signal according to the configuration information, transmitting the sensing reference signal according to the configuration information, or a combination thereof.

In certain embodiments, the method 1600 further comprises transmitting additional configuration information defining a superset of the sensing reference signal resource pattern parameters. In some embodiments, the method 1600 further comprises transmitting additional configuration information to the first device, wherein the additional configuration information defines a criterion for computing, selecting, or a combination thereof of remaining sensing reference signal pattern parameters.

In various embodiments, the method 1600 further comprises transmitting additional configuration information indicating an application for recovered information from sensing reference signal pattern parameters. In one embodiment, the method 1600 further comprises: transmitting a configuration defining a superset of the sensing reference signal sequence parameters; transmitting additional configuration information defining a criterion for computing, selecting, or a combination thereof the remaining sensing reference signal sequence parameters; or a combination thereof. In certain embodiments, the method 1600 further comprises transmitting additional configuration information indicating an application for recovered information.

In one embodiment, a method of a first device comprises: receiving configuration information from a second device, wherein the configuration comprises: a set of sensing reference signal sequence generation parameters; a set of sensing reference signal resource pattern parameters, wherein a pattern corresponding to the set of sensing reference signal resource pattern parameters comprises time domain locations of symbols within a sensing reference signal, frequency domain locations of resource elements within the sensing reference signal, or a combination thereof; and information indicating to map a generated sequence based on the pattern on at least one antenna to create a sensing reference signal pattern; generating a sensing reference signal; and transmitting the sensing reference signal according to the configuration information, receiving the sensing reference signal according to the configuration information, or a combination thereof.

In certain embodiments, a time domain resource pattern corresponding to the pattern comprises: a parameter defining a time block (a time duration equal to one or multiple slots or a known number of symbols where a time-block serves as a unit to build the sensing RS time-domain pattern, e.g., a time-block and the pattern therein may be repeated with a defined periodicity and/or pattern within the sensing RS); a parameter defining a first symbol location belonging to the sensing reference signal within a radio frame; a parameter defining the first symbol location belonging to the sensing reference signal within a slot or within the time block; a parameter defining a first slot or the time block including at least a portion of the sensing reference signal; a parameter defining a number of symbols belonging to the sensing reference signal; a parameter defining a time duration (e.g., in terms of number of symbols, slots, time-blocks, and so forth) in which the sensing reference signal is present (e.g., although, not necessarily at all symbols); a parameter defining a number of slots or a number of time blocks that contain at least one element of the sensing reference signal; a parameter defining the number of symbols belonging to the sensing reference signal within a slot, or a time block; a parameter defining a distance between two consecutive sensing reference signal symbols within a slot, or a time block; a parameter defining a distance between two consecutive slots, or two consecutive time blocks belonging to a sensing reference signal; or some combination thereof.

In some embodiments, the time domain resource pattern is at least partly defined via an index from a mapping table (e.g., interchangeably denoted as codebook in some embodiments and/or explanations), and the mapping table defines: sensing reference signal symbol time domain positions; sensing reference signal symbol positions within a slot, a time block, or a combination thereof; sensing reference signal slots, sensing reference signal time block positions, or a combination thereof containing sensing reference signal elements; or some combination thereof.

In various embodiments, a frequency domain resource pattern of the pattern comprises: a parameter defining a frequency block (a frequency bandwidth equal to one or multiple RBs or a known number of REs where a frequency-block serves as a unit to build the sensing RS frequency domain pattern, e.g., a frequency-block and the pattern therein may be repeated along the frequency axis with a defined periodicity and/or pattern to build the sensing RS pattern in the frequency domain); a parameter defining a first resource element location belonging to the sensing reference signal within a bandwidth part; a parameter defining the first resource element location belonging to the sensing reference signal within a resource block or within a defined frequency block; a parameter defining a first resource block or frequency block including a sensing reference signal element; a parameter defining a number of resource elements belonging to the sensing reference signal; a parameter defining a bandwidth (e.g., in terms of number of REs, RBs, frequency blocks) in which the sensing reference signal is present along a frequency axis (e.g., although, not necessarily at all RE or all RBs); a parameter defining a number of resource blocks, or a number of frequency blocks that contain at least one element of the sensing reference signal; a parameter defining a number of resource elements belonging to the sensing reference signal within a resource block, or a frequency block; a parameter defining a distance between two consecutive sensing reference signal resource elements along a frequency domain within a resource block, or a frequency block; a parameter defining a distance between two consecutive resource blocks, or frequency blocks belonging to the sensing reference signal; or some combination thereof.

In one embodiment, the frequency domain resource pattern is at least partially defined via an index from a mapping table, wherein the mapping table defines: sensing reference signal resource element positions along a frequency axis; sensing reference signal resource element positions within a resource block, a frequency block, or a combination thereof; sensing reference signal resource block, frequency block positions, or a combination thereof containing sensing reference signal elements; or some combination thereof.

In certain embodiments, the pattern comprises a frequency domain hopping configuration, and the frequency domain hopping configuration comprises: at least two frequency domain patterns (e.g., where the frequency domain pattern at different symbols alternates among the patterns); a frequency domain pattern modification (e.g., as a combination with as second frequency domain pattern where the second pattern and the combination type are also indicated); a time domain pattern wherein an alternate frequency domain pattern or a pattern modifications takes place; a frequency domain hopping pattern defined via an index from a codebook, wherein the codebook defines frequency domain hopping patterns; or some combination thereof.

In some embodiments, a joint time and frequency domain sensing reference signal resource pattern corresponding to the pattern is at least partly defined via an index from a mapping table, wherein the mapping table defines: sensing reference signal resource element positions jointly along a time and frequency axis; sensing reference signal resource element positions within a time frequency resource plain corresponding to a resource block, a frequency block, a slot, a time block, or some combination thereof; a joint time and frequency position of sensing reference signal time frequency resource planes (corresponding to the time-domain position of a time block and/or slot and frequency domain position of a RB and/or frequency block positions containing sensing RS elements); or some combination thereof.

In various embodiments, the configuration information further comprises: a time domain pattern as a subset of the sensing reference signal pattern along a time domain, wherein symbol locations belonging to the time domain pattern follow an alternate cyclic prefix overhead; a cyclic prefix overhead parameter corresponding to the time domain pattern; or a combination thereof.

In one embodiment, at least one of the sensing reference signal parameters (e.g., the sensing RS time-domain pattern or the sensing RS frequency domain pattern, or the sensing RS joint time and frequency domain pattern) is defined via: an indication of a previously defined reference signal or a reference signal parameter (e.g., the RS may be but is not necessarily a sensing RS); a sensing reference signal parameter or a modified parameter; or a combination thereof.

In certain embodiments, the previously defined reference signal comprises a downlink preference signal, a downlink channel state information reference signal, an uplink preference signal, a downlink demodulation reference signal, an uplink demodulation reference signal, a downlink phase tracking reference signal, an uplink phase tracking reference signal, or some combination thereof.

In some embodiments, a combination type among two resource patterns defined in a time domain, in a frequency domain, or in the time domain and the frequency domain is defined as: a displaced version of a first pattern (e.g., along the time-domain, frequency domain, or jointly along the time and frequency domain) based on a first displacement parameter; a displaced version of a second pattern (e.g., along the time-domain, frequency domain, or jointly along the time and frequency domain) based on a second displacement parameter; a concatenation of the first pattern with the second pattern in the time domain, in the frequency domain, or in the time domain and the frequency domain with a defined distance based on a third displacement parameter (e.g., the second pattern comes after the first one with a defined gap and/or displacement along the time domain, frequency domain, or jointly along the time and frequency domain); a union of the first pattern with the second pattern (e.g., an RE is the member of the resulting resource pattern if it appears in any one of the initially combined patterns (with/without displacement)); an intersection of the first pattern with the second pattern (e.g., an RE is the member of the resulting resource pattern if it appears in both of the initially combined patterns (with/without displacement)); a subtraction of the second pattern from the first pattern (e.g., an RE is the member of the resulting resource pattern if it appears in in the first pattern and not in the second pattern (each with/without displacement)); or some combination thereof (e.g., a displacement and a union and/or subtraction can take place jointly).

In various embodiments, a combination type among a first resource pattern defined in a time domain, a frequency domain, or in the time domain and the frequency domain and a second resource pattern defined in the time domain, the frequency domain, or in the time domain and the frequency domain, or a combination thereof is defined as: a displaced version of the first resource pattern (e.g., along the time-domain, frequency domain, or jointly along the time and frequency domain) based on a displacement parameter; a repetition of the first resource pattern along the time domain based on a first repetition parameter set (e.g., including periodicity, number of repetitions and separation/displacement between two subsequent repetition); a repetition of the first resource pattern along the frequency domain based on a second repetition parameter set (e.g., including frequency domain periodicity, number of repetitions and frequency domain separation and/or displacement between two subsequent repetition); a repetition of the first resource pattern along the time domain and the frequency domain based on a third repetition parameter set; a repetition of the first resource pattern according to the second resource pattern (considering a mask and/or membership 2-D matrix corresponding to a time-frequency domain pattern where '1' defines that the corresponding RE is a member of a pattern and '0' indicates that the RE is not a member of the pattern at the corresponding position. Then, the repetition can be considered as a Kronecker product among the mask matrices, or a mask matrix constructed from the second pattern, where the elements '1' are replaced by the mask matrix of the first pattern, and the elements '0' are replaces with a single zero column or row vector according to the first and second mask matrix dimension); or some combination thereof.

In one embodiment, a combination type among a sensing reference signal parameter and a second parameter comprises calculating an operation among the sensing reference signal parameter and the second parameter (e.g., the maximum value among the two parameters or calculating the minimum value among the two parameters, multiplication the two parameters, addition among the two parameters or subtraction among the two parameters or average among the two parameters, logical X-OR or AND or OR among the two parameters or a combination thereof e.g., increasing the number of slots or time-domain density by one unit or pattern expansion, e.g., increasing the sensing slots distance by one slot).

In certain embodiments, a time frequency resource pattern of the sensing reference to signal is defined according to a previously defined reference signal and a repetition pattern, and the sequence generation and sequence-to-resource mapping procedure for the sensing reference signal is defined via: redefining the sensing reference signal sequence and mapping according to the time frequency resource pattern (e.g., including the number of REs, sequence length, etc.); repetition of the reference signal sequence within a repeated resource pattern; or a combination thereof.

In some embodiments, the method further comprises a computation stage, a search stage, or a combination thereof at the first device if a subset of the sensing reference signal resource pattern parameters are not defined (e.g., either when the first device is operating as a sensing TX node or a sensing RX node).

In various embodiments, the method further comprises receiving additional configuration information defining a superset of the sensing reference signal resource pattern parameters (e.g., facilitating the search via defining a reference search space, when first device is the sensing Rx).

In one embodiment, the method further comprises receiving additional configuration information from the second device, wherein the additional configuration information defines a criterion for computing, selecting, or a combination thereof of remaining sensing reference signal pattern parameters (when first device is the sensing TX, e.g., choosing a frequency domain pattern among two possible ones, or choosing to use/not use a set of REs and do/do not perform power-boosting on the remaining REs).

In certain embodiments, the method further comprises receiving additional configuration information indicating an application for recovered information from sensing reference signal pattern parameters.

In some embodiments, the method further comprises a computation stage, a search stage, or a combination thereof at the first device if a subset of the sensing reference signal sequence parameters are not defined.

In various embodiments, the method further comprises: receiving a configuration defining a superset of the sensing reference signal sequence parameters (e.g., facilitating the search via defining a reference search space, when first device is the sensing RX); receiving additional configuration information defining a criterion for computing, selecting, or a combination thereof the remaining sensing reference signal sequence parameters; or a combination thereof (e.g., when first device is the sensing TX or both sensing TX and sensing RX).

In one embodiment, the method further comprises receiving additional configuration information indicating an application for recovered information (e.g., the recovered info from the search and/or determination process for the sensing RS sequence defining parameters for the case where the first device is a sensing RX).

In certain embodiments, a signal sequence (e.g., the sequence of values which are later mapped to the physical time and/or frequency resources) for the sensing reference signal is defined via a set of parameters indicating: a type, an index, or a combination thereof of a root sequence of a Zadoff-Chu sequence; a length of the Zadoff-Chu sequence; a sequence shift of the Zadoff-Chu sequence; or some combination thereof.

In some embodiments, a signal for the sensing reference signal is defined via a set of parameters indicating: a sequence used as an initialization of a sequence generator for a Gold binary sequence; a length of the Gold binary sequence; a binary-to-complex-value transformation for a generated binary sequence; or some combination thereof.

In various embodiments, a signal sequence for the sensing reference signal is defined via (e.g., when the sequence is defined via the n-times repetition of a sequence previously defined for a DMRS or a portion thereof): an indication of an a priori defined sequence; an indication of a portion of the a priori defined sequence; an indication of a repetition of the a priori defined sequence or a portion thereof; or some combination thereof.

In one embodiment, generation of the signal sequence comprises a scrambling or an encryption according to (e.g., to run an X-OR operation on the base binary Gold sequence or running a hash function on the previously generated sequence): a number computed from a secret key known only by a network; a number computed from the secret key known by the network and the first device; a radio network temporary identifier known by the first device; a group common radio network temporary identifier (e.g., when the sensing RS shall be known to a group of UEs involved in the sensing task); or some combination thereof.

In certain embodiments, the information indicating to map the generated sequence further comprises: prioritization along a time domain (e.g., the sequence fills the REs along the time domain first); prioritization along a frequency domain (e.g., the sequence fills the REs along the frequency domain first); a block length along the time domain (e.g., the sequence fills the REs first within the time-domain block); a block length along the frequency domain (e.g., the sequence fills the REs first within the frequency domain block); an index from a codebook, wherein the codebook defines a mapping strategy; or some combination thereof.

In some embodiments, the information indicating to map the generated sequence further comprises: a definition of a code block group pattern along a time domain, a frequency domain, or a combination thereof; a definition of orthogonal sequences within each code block group is assigned to a sensing reference signal; a definition of mapping a sequence value to a corresponding code block group (e.g., via multiplication of the said sequence value with the orthogonal sequence corresponding to the code block group); or a combination thereof.

In various embodiments, the orthogonal sequences are defined via an index from a codebook, or via a parameterization comprising: a time domain length, a frequency domain length, a total block size in number of resource elements, or a combination thereof; a type of the orthogonal sequence; or a combination thereof.

In some embodiments, the information indicating to map the generated sequence further comprises: a definition of a harmonic multiplication along a time domain for the sensing reference signal (e.g., phase rotation proportional to the time-domain displacement of a sensing RS sequence value); a definition of the harmonic multiplication along a frequency domain for the sensing reference signal (e.g., phase rotation proportional to the freq.-domain displacement of a sensing RS sequence value); a definition of the harmonic multiplication along the time domain and the frequency domain for the sensing reference signal; a definition of a linear time, a frequency filter, or a combination thereof applied to a sensing reference signal sequence value; or some combination thereof.

In one embodiment, the information indicating to map the generated sequence further comprises a power adjustment pattern along a time domain, along a frequency axis, or along the time domain and the frequency axis (e.g., relative adjustment via power ratio definition or the absolute transmit power definition).

In certain embodiments, a first subset of the sensing reference signal parameters is defined via a first previously defined reference signal or a first defined parameter set, and a second subset of the sensing reference signal parameters is defined via a second previously defined reference signal or second defined parameter set (e.g., defining a sensing RS via frequency domain pattern and sequence of a previously defined DMRS together with a separately defined time-domain pattern or a time-domain pattern of another previously defined DMRS and/or CSI-RS).

In one embodiment, an apparatus comprises a first device. The apparatus further comprises: a receiver that receives configuration information from a second device, wherein the configuration comprises: a set of sensing reference signal sequence generation parameters; a set of sensing reference signal resource pattern parameters, wherein a pattern corresponding to the set of sensing reference signal resource pattern parameters comprises time domain locations of symbols within a sensing reference signal, frequency domain locations of resource elements within the sensing reference signal, or a combination thereof; and information indicating to map a generated sequence based on the pattern on at least one antenna to create a sensing reference signal pattern; a processor that generates a sensing reference signal; and a transmitter, wherein the transmitter transmits the sensing reference signal according to the configuration information, the receiver receives the sensing reference signal according to the configuration information, or a combination thereof.

In certain embodiments, a time domain resource pattern corresponding to the pattern comprises: a parameter defining a time block; a parameter defining a first symbol location belonging to the sensing reference signal within a radio frame; a parameter defining the first symbol location belonging to the sensing reference signal within a slot or within the time block; a parameter defining a first slot or the time block including at least a portion of the sensing reference signal; a parameter defining a number of symbols belonging to the sensing reference signal; a parameter defining a time duration in which the sensing reference signal is present; a parameter defining a number of slots or a number of time blocks that contain at least one element of the sensing reference signal; a parameter defining the number of symbols belonging to the sensing reference signal within a slot, or a time block; a parameter defining a distance between two consecutive sensing reference signal symbols within a slot, or a time block; a parameter defining a distance between two consecutive slots, or two consecutive time blocks belonging to a sensing reference signal; or some combination thereof.

In some embodiments, the time domain resource pattern is at least partly defined via an index from a mapping table, and the mapping table defines: sensing reference signal symbol time domain positions; sensing reference signal symbol positions within a slot, a time block, or a combination thereof; sensing reference signal slots, sensing reference signal time block positions, or a combination thereof containing sensing reference signal elements; or some combination thereof.

In various embodiments, a frequency domain resource pattern of the pattern comprises: a parameter defining a frequency block; a parameter defining a first resource element location belonging to the sensing reference signal within a bandwidth part; a parameter defining the first resource element location belonging to the sensing reference signal within a resource block or within a defined frequency block; a parameter defining a first resource block or frequency block including a sensing reference signal element; a parameter defining a number of resource elements belonging to the sensing reference signal; a parameter defining a bandwidth in which the sensing reference signal is present along a frequency axis; a parameter defining a number of resource blocks, or a number of frequency blocks that contain at least one element of the sensing reference signal; a parameter defining a number of resource elements belonging to the sensing reference signal within a resource block, or a frequency block; a parameter defining a distance between two consecutive sensing reference signal resource elements along a frequency domain within a resource block, or a frequency block; a parameter defining a distance between two consecutive resource blocks, or frequency blocks belonging to the sensing reference signal; or some combination thereof.

In one embodiment, the frequency domain resource pattern is at least partially defined via an index from a mapping table, wherein the mapping table defines: sensing reference signal resource element positions along a frequency axis; sensing reference signal resource element positions within a resource block, a frequency block, or a combination thereof; sensing reference signal resource block, frequency block positions, or a combination thereof containing sensing reference signal elements; or some combination thereof.

In certain embodiments, the pattern comprises a frequency domain hopping configuration, and the frequency domain hopping configuration comprises: at least two frequency domain patterns; a frequency domain pattern modification; a time domain pattern wherein an alternate frequency domain pattern or a pattern modifications takes place; a frequency domain hopping pattern defined via an index from a codebook, wherein the codebook defines frequency domain hopping patterns; or some combination thereof.

In some embodiments, a joint time and frequency domain sensing reference signal resource pattern corresponding to the pattern is at least partly defined via an index from a mapping table, wherein the mapping table defines: sensing reference signal resource element positions jointly along a time and frequency axis; sensing reference signal resource element positions within a time frequency resource plain corresponding to a resource block, a frequency block, a slot, a time block, or some combination thereof; a joint time and frequency position of sensing reference signal time frequency resource planes; or some combination thereof.

In various embodiments, the configuration information further comprises: a time domain pattern as a subset of the sensing reference signal pattern along a time domain, wherein symbol locations belonging to the time domain pattern follow an alternate cyclic prefix overhead; a cyclic prefix overhead parameter corresponding to the time domain pattern; or a combination thereof.

In one embodiment, at least one of the sensing reference signal parameters is defined via: an indication of a previously defined reference signal or a reference signal parameter; a sensing reference signal parameter or a modified parameter; or a combination thereof.

In certain embodiments, the previously defined reference signal comprises a downlink preference signal, a downlink channel state information reference signal, an uplink preference signal, a downlink demodulation reference signal, an uplink demodulation reference signal, a downlink phase tracking reference signal, an uplink phase tracking reference signal, or some combination thereof.

In some embodiments, a combination type among two resource patterns defined in a time domain, in a frequency domain, or in the time domain and the frequency domain is defined as: a displaced version of a first pattern based on a first displacement parameter; a displaced version of a second pattern based on a second displacement parameter; a concatenation of the first pattern with the second pattern in the time domain, in the frequency domain, or in the time domain and the frequency domain with a defined distance based on a third displacement parameter; a union of the first pattern with the second pattern; an intersection of the first pattern with the second pattern; a subtraction of the second pattern from the first pattern; or some combination thereof.

In various embodiments, a combination type among a first resource pattern defined in a time domain, a frequency domain, or in the time domain and the frequency domain and a second resource pattern defined in the time domain, the frequency domain, or in the time domain and the frequency domain, or a combination thereof is defined as: a displaced version of the first resource pattern based on a displacement parameter; a repetition of the first resource pattern along the time domain based on a first repetition parameter set; a repetition of the first resource pattern along the frequency domain based on a second repetition parameter set; a repetition of the first resource pattern along the time domain and the frequency domain based on a third repetition parameter set; a repetition of the first resource pattern according to the second resource pattern; or some combination thereof.

In one embodiment, a combination type among a sensing reference signal parameter and a second parameter comprises calculating an operation among the sensing reference signal parameter and the second parameter.

In certain embodiments, a time frequency resource pattern of the sensing reference signal is defined according to a previously defined reference signal and a repetition pattern, and the sequence generation and sequence-to-resource mapping procedure for the sensing reference signal is defined via: redefining the sensing reference signal sequence and mapping according to the time frequency resource pattern; repetition of the reference signal sequence within a repeated resource pattern; or a combination thereof.

In some embodiments, the apparatus further comprises a computation stage, a search stage, or a combination thereof at the first device if a subset of the sensing reference signal resource pattern parameters are not defined.

In various embodiments, the receiver receives additional configuration information defining a superset of the sensing reference signal resource pattern parameters.

In one embodiment, the receiver receives additional configuration information from the second device, the additional configuration information defines a criterion for computing, selecting, or a combination thereof of remaining sensing reference signal pattern parameters.

In certain embodiments, the receiver receives additional configuration information indicating an application for recovered information from sensing reference signal pattern parameters.

In some embodiments, the apparatus further comprises a computation stage, a search stage, or a combination thereof at the first device if a subset of the sensing reference signal sequence parameters are not defined.

In various embodiments: the receiver receives a configuration defining a superset of the sensing reference signal sequence parameters; the receiver receives additional configuration information defining a criterion for computing, selecting, or a combination thereof the remaining sensing reference signal sequence parameters; or a combination thereof.

In one embodiment, the receiver receives additional configuration information indicating an application for recovered information.

In certain embodiments, a signal sequence for the sensing reference signal is defined via a set of parameters indicating: a type, an index, or a combination thereof of a root sequence of a Zadoff-Chu sequence; a length of the Zadoff-Chu sequence; a sequence shift of the Zadoff-Chu sequence; or some combination thereof.

In some embodiments, a signal for the sensing reference signal is defined via a set of parameters indicating: a sequence used as an initialization of a sequence generator for a Gold binary sequence; a length of the Gold binary sequence; a binary-to-complex-value transformation for a generated binary sequence; or some combination thereof.

In various embodiments, a signal sequence for the sensing reference signal is defined via: an indication of an a priori defined sequence; an indication of a portion of the a priori defined sequence; an indication of a repetition of the a priori defined sequence or a portion thereof; or some combination thereof.

In one embodiment, the processor generating the signal sequence comprises the processor scrambling or the processor encrypting according to: a number computed from a secret key known only by a network; a number computed from the secret key known by the network and the first device; a radio network temporary identifier known by the first device; a group common radio network temporary identifier; or some combination thereof.

In certain embodiments, the information indicating to map the generated sequence further comprises: prioritization along a time domain; prioritization along a frequency domain; a block length along the time domain; a block length along the frequency domain; an index from a codebook, wherein the codebook defines a mapping strategy; or some combination thereof.

In some embodiments, the information indicating to map the generated sequence further comprises: a definition of a code block group pattern along a time domain, a frequency domain, or a combination thereof; a definition of orthogonal sequences within each code block group is assigned to a sensing reference signal; a definition of mapping a sequence value to a corresponding code block group; or a combination thereof.

In various embodiments, the orthogonal sequences are defined via an index from a codebook, or via a parameterization comprising: a time domain length, a frequency domain length, a total block size in number of resource elements, or a combination thereof; a type of the orthogonal sequence; or a combination thereof.

In one embodiment, the information indicating to map the generated sequence further comprises: a definition of a harmonic multiplication along a time domain for the sensing reference signal; a definition of the harmonic multiplication along a frequency domain for the sensing reference signal; a definition of the harmonic multiplication along the time domain and the frequency domain for the sensing reference signal; a definition of a linear time, a frequency filter, or a combination thereof applied to a sensing reference signal sequence value; or some combination thereof.

In certain embodiments, the information indicating to map the generated sequence further comprises a power adjustment pattern along a time domain, along a frequency axis, or along the time domain and the frequency axis.

In some embodiments, a first subset of the sensing reference signal parameters is defined via a first previously defined reference signal or a first defined parameter set, and a second to subset of the sensing reference signal parameters is defined via a second previously defined reference signal or second defined parameter set.

In one embodiment, a method of a second device comprises: transmitting configuration information to a first device, wherein the configuration comprises: a set of sensing reference signal sequence generation parameters; a set of sensing reference signal resource pattern parameters, wherein a pattern corresponding to the set of sensing reference signal resource pattern parameters comprises time domain locations of symbols within a sensing reference signal, frequency domain locations of resource elements within the sensing reference signal, or a combination thereof; and information indicating to map a generated sequence based on the pattern on at least one antenna to create a sensing reference signal pattern; and receiving the sensing reference signal according to the configuration information, transmitting the sensing reference signal according to the configuration information, or a combination thereof.

In certain embodiments, the method further comprises transmitting additional configuration information defining a superset of the sensing reference signal resource pattern parameters.

In some embodiments, the method further comprises transmitting additional configuration information to the first device, wherein the additional configuration information defines a criterion for computing, selecting, or a combination thereof of remaining sensing reference signal pattern parameters.

In various embodiments, the method further comprises transmitting additional configuration information indicating an application for recovered information from sensing reference signal pattern parameters.

In one embodiment, the method further comprises: transmitting a configuration defining a superset of the sensing reference signal sequence parameters; transmitting additional configuration information defining a criterion for computing, selecting, or a combination thereof the remaining sensing reference signal sequence parameters; or a combination thereof.

In certain embodiments, the method further comprises transmitting additional configuration information indicating an application for recovered information.

In one embodiment, an apparatus comprises a second device. The apparatus further comprises: a transmitter that transmits configuration information to a first device, wherein the configuration comprises: a set of sensing reference signal sequence generation parameters; a set of sensing reference signal resource pattern parameters, wherein a pattern corresponding to the set of sensing reference signal resource pattern parameters comprises time domain locations of to symbols within a sensing reference signal, frequency domain locations of resource elements within the sensing reference signal, or a combination thereof; and information indicating to map a generated sequence based on the pattern on at least one antenna to create a sensing reference signal pattern; and a receiver, wherein the receiver receives the sensing reference signal according to the configuration information, the transmitter transmits the sensing reference signal according to the configuration information, or a combination thereof.

In certain embodiments, the transmitter transmits additional configuration information defining a superset of the sensing reference signal resource pattern parameters.

In some embodiments, the transmitter transmits additional configuration information to the first device, wherein the additional configuration information defines a criterion for computing, selecting, or a combination thereof of remaining sensing reference signal pattern parameters.

In various embodiments, the transmitter transmits additional configuration information indicating an application for recovered information from sensing reference signal pattern parameters.

In one embodiment: the transmitter transmits a configuration defining a superset of the sensing reference signal sequence parameters; the transmitter transmits additional configuration information defining a criterion for computing, selecting, or a combination thereof the remaining sensing reference signal sequence parameters; or a combination thereof.

In certain embodiments, the transmitter transmits additional configuration information indicating an application for recovered information.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a first device, the method comprising:
   receiving configuration information from a second device, wherein the configuration information comprises:
   a set of sensing reference signal sequence generation parameters;
   a set of sensing reference signal resource pattern parameters, wherein a pattern corresponding to the set of sensing reference signal resource pattern parameters comprises time domain locations of symbols within a sensing reference signal, frequency domain locations of resource elements within the sensing reference signal, or a combination thereof; and
   information indicating to map a generated sequence based on the pattern on at least one antenna to create a sensing reference signal pattern;
   generating a sensing reference signal; and
   transmitting the sensing reference signal according to the configuration information, receiving the sensing reference signal according to the configuration information, or a combination thereof.

2. The method of claim 1, wherein a frequency domain resource pattern of the pattern comprises:
   a parameter defining a frequency block;
   a parameter defining a first resource element location belonging to the sensing reference signal within a bandwidth part;
   a parameter defining the first resource element location belonging to the sensing reference signal within a resource block or within a defined frequency block;
   a parameter defining a first resource block or frequency block including a sensing reference signal element;
   a parameter defining a number of resource elements belonging to the sensing reference signal;
   a parameter defining a bandwidth in which the sensing reference signal is present along a frequency axis;
   a parameter defining a number of resource blocks, or a number of frequency blocks that contain at least one element of the sensing reference signal;
   a parameter defining a number of resource elements belonging to the sensing reference signal within a resource block, or a frequency block;
   a parameter defining a distance between two consecutive sensing reference signal resource elements along a frequency domain within a resource block, or a frequency block;
   a parameter defining a distance between two consecutive resource blocks, or frequency blocks belonging to the sensing reference signal;
   or some combination thereof.

3. The method of claim 2, wherein the frequency domain resource pattern is at least partially defined via an index from a mapping table, wherein the mapping table defines:
   sensing reference signal resource element positions along a frequency axis;
   sensing reference signal resource element positions within a resource block, a frequency block, or a combination thereof;
   sensing reference signal resource block, frequency block positions, or a combination thereof containing sensing reference signal elements;
   or some combination thereof.

4. The method of claim 1, wherein the pattern comprises a frequency domain hopping configuration, and the frequency domain hopping configuration comprises:
   at least two frequency domain patterns;
   a frequency domain pattern modification;
   a time domain pattern wherein an alternate frequency domain pattern or a pattern modifications takes place;
   a frequency domain hopping pattern defined via an index from a codebook, wherein the codebook defines frequency domain hopping patterns;
   or some combination thereof.

5. The method of claim 1, wherein a joint time and frequency domain sensing reference signal resource pattern corresponding to the pattern is at least partly defined via an index from a mapping table, wherein the mapping table defines:
   sensing reference signal resource element positions jointly along a time and frequency axis;
   sensing reference signal resource element positions within a time frequency resource plain corresponding to a resource block, a frequency block, a slot, a time block, or some combination thereof;
   a joint time and frequency position of sensing reference signal time frequency resource planes;
   or some combination thereof.

6. The method of claim 1, wherein the configuration information further comprises:
   at least one time domain pattern as a subset of the sensing reference signal pattern along a time domain, wherein symbol locations belonging to the at least one time domain pattern follow an alternate cyclic prefix overhead;
   at least one cyclic prefix overhead parameter corresponding to an indicated time domain pattern;
   or a combination thereof.

7. The method of claim 1, wherein at least one of the set of sensing reference signal sequence generation parameters is defined via:
   an indication of a first previously defined reference signal or a reference signal parameter;
   an indication of a second previously defined reference signal;
   at least one sensing reference signal parameter or at least one modified parameter;
   a combination type, wherein the combination type is used to generate a new reference signal parameter based on previously defined reference signals or reference signal parameters;
   to or a combination thereof.

8. The method of claim 7, wherein the previously defined reference signals comprises a downlink preference signal, a downlink channel state information reference signal, an uplink preference signal, a downlink demodulation reference signal, an uplink demodulation reference signal, a downlink phase tracking reference signal, an uplink phase tracking reference signal, or some combination thereof.

9. The method of claim 7, wherein a combination type among two resource patterns defined in a time domain, in a frequency domain, or in the time domain and the frequency domain is defined as:
- a displaced version of a first pattern based on a first displacement parameter;
- a displaced version of a second pattern based on a second displacement parameter;
- a concatenation of the first pattern with the second pattern in the time domain, in the frequency domain, or in the time domain and the frequency domain with a defined distance based on a third displacement parameter;
- a union of the first pattern with the second pattern;
- an intersection of the first pattern with the second pattern;
- a subtraction of the second pattern from the first pattern;
- or some combination thereof.

10. The method of claim 7, wherein a combination type among a first resource pattern defined in a time domain, a frequency domain, or in the time domain and the frequency domain and a second resource pattern defined in the time domain, the frequency domain, or in the time domain and the frequency domain, or a combination thereof is defined as:
- a displaced version of the first resource pattern based on a displacement parameter;
- a repetition of the first resource pattern along the time domain based on a first repetition parameter set;
- a repetition of the first resource pattern along the frequency domain based on a second repetition parameter set;
- a repetition of the first resource pattern along the time domain and the frequency domain based on a third repetition parameter set;
- a repetition of the first resource pattern according to the second resource pattern;
- or some combination thereof.

11. The method of claim 7, wherein a combination type among a sensing reference signal parameter and a second parameter comprises calculating an operation among the sensing reference signal parameter and the second parameter.

12. The method of claim 7, wherein a time frequency resource pattern of the sensing reference signal is defined according to a previously defined reference signal and a repetition pattern, and a sequence generation and sequence-to-resource mapping procedure for the sensing reference signal is defined via:
- redefining a sensing reference signal sequence and mapping according to the time frequency resource pattern;
- repetition of the sensing reference signal sequence within a repeated resource pattern;
- or a combination thereof.

13. The method of claim 1, wherein a signal sequence for the sensing reference signal is defined via a set of parameters indicating:
- a type, an index, or a combination thereof of a root sequence of a Zadoff-Chu sequence;
- a length of the Zadoff-Chu sequence;
- a sequence shift of the Zadoff-Chu sequence;
- or some combination thereof.

14. The method of claim 1, wherein a signal for the sensing reference signal is defined via a set of parameters indicating:
- a sequence used as an initialization of a sequence generator for a Gold binary sequence;
- a length of the Gold binary sequence;
- a binary-to-complex-value transformation for a generated binary sequence;
- or some combination thereof.

15. The method of claim 1, wherein a signal sequence for the sensing reference signal is defined via:
- an indication of an a priori defined sequence;
- an indication of a portion of the a priori defined sequence;
- an indication of a repetition of the a priori defined sequence or a portion thereof;
- or some combination thereof.

16. The method of claim 1, wherein the information indicating to map the generated sequence further comprises:
- a definition of a code block group pattern along a time domain, a frequency domain, or a combination thereof;
- a definition of orthogonal sequences within each code block group is assigned to a sensing reference signal;
- a definition of mapping a sequence value to a corresponding code block group;
- or a combination thereof.

17. The method of claim 1, wherein the information indicating to map the generated sequence further comprises:
- a definition of a harmonic multiplication along a time domain for the sensing reference signal;
- a definition of the harmonic multiplication along a frequency domain for the sensing reference signal;
- a definition of the harmonic multiplication along the time domain and the frequency domain for the sensing reference signal;
- a definition of a linear time, a frequency filter, or a combination thereof applied to a sensing reference signal sequence value;
- or some combination thereof.

18. The method of claim 1, wherein the information indicating to map the generated sequence further comprises a power adjustment pattern along a time domain, along a frequency axis, or along the time domain and the frequency axis.

19. An apparatus comprising a first device, the apparatus further comprising:
- a receiver that receives configuration information from a second device, wherein the configuration information comprises:
  - a set of sensing reference signal sequence generation parameters;
  - a set of sensing reference signal resource pattern parameters, wherein a pattern corresponding to the set of sensing reference signal resource pattern parameters comprises time domain locations of symbols within a sensing reference signal, frequency domain locations of resource elements within the sensing reference signal, or a combination thereof; and
  - information indicating to map a generated sequence based on the pattern on at least one antenna to create a sensing reference signal pattern;
- a processor that generates a sensing reference signal; and
- a transmitter that transmits the sensing reference signal according to the configuration information, the receiver receives the sensing reference signal according to the configuration information, or a combination thereof.

20. An apparatus comprising a second device, the apparatus further comprising:
- a transmitter that transmits configuration information to a first device, wherein the configuration information comprises:

a set of sensing reference signal sequence generation parameters;

a set of sensing reference signal resource pattern parameters, wherein a pattern corresponding to the set of sensing reference signal resource pattern parameters comprises time domain locations of symbols within a sensing reference signal, frequency domain locations of resource elements within the sensing reference signal, or a combination thereof; and information indicating to map a generated sequence based on the pattern on at least one antenna to create a sensing reference signal pattern; and a receiver that receives the sensing reference signal according to the configuration information, the transmitter transmits the sensing reference signal according to the configuration information, or a combination thereof.

\* \* \* \* \*